(12) United States Patent
Michels

(10) Patent No.: US 11,667,415 B2
(45) Date of Patent: Jun. 6, 2023

(54) FLAT-BOTTOM STAND-UP BAG, VERTICAL FORM, FILL, AND SEAL SYSTEM AND METHODOLOGY FOR UTILIZING THE SAME

(71) Applicant: Kellogg Company, Battle Creek, MI (US)

(72) Inventor: John Joseph Michels, Portage, MI (US)

(73) Assignee: KELLOGG COMPANY, Battle Creek, MI (US)

( * ) Notice: Subject to any disclaimer, the term of this patent is extended or adjusted under 35 U.S.C. 154(b) by 1131 days.

(21) Appl. No.: 16/267,920

(22) Filed: Feb. 5, 2019

(65) Prior Publication Data

US 2019/0241289 A1   Aug. 8, 2019

Related U.S. Application Data

(62) Division of application No. 15/066,801, filed on Mar. 10, 2016, now Pat. No. 10,239,644.

(Continued)

(51) Int. Cl.
*B65B 9/20* (2012.01)
*B29C 65/74* (2006.01)
(Continued)

(52) U.S. Cl.
CPC ............ *B65B 9/20* (2013.01); *B29C 65/7441* (2013.01); *B29C 66/1122* (2013.01);
(Continued)

(58) Field of Classification Search
CPC .............................. B65D 31/10; B65D 75/008
(Continued)

(56) References Cited

U.S. PATENT DOCUMENTS 1,015,007 A * 1/1912 Cutler .................... B65D 31/10
383/120
3,395,622 A * 8/1968 Kugler ................ B29C 66/1122
383/122

(Continued)

FOREIGN PATENT DOCUMENTS

DE           4431933         3/1996
EP           0173506         3/1986
(Continued)

OTHER PUBLICATIONS

PCT/US2016/021825 International Search Report dated May 18, 2016.

*Primary Examiner* — Peter N Helvey
(74) *Attorney, Agent, or Firm* — Honigman LLP

(57) ABSTRACT

A vertical form fill and seal system supports a sheet of material having material segments and a tube sized for drawing edges of the elongated sheet of material together in an overlapping configuration to form the sheet into a substantially tube shape. The VFFS also includes a sealer that seals the edges of the material to one another and a gusseting mechanism sized for forming a gusseted tuck in each of a left panel portion of the material and a right panel portion of the material. A cutting mechanism removes a first portion and a second portion of a first segment of the material segments in order to form a first cut and a second cut in the first segment and a sealing mechanism folds and seals the first segment at the first cut and at the second cut to provide an end wall with a substantially flat, rectangular-shaped footprint.

6 Claims, 33 Drawing Sheets

Related U.S. Application Data

(60) Provisional application No. 62/134,877, filed on Mar. 18, 2015.

(51) Int. Cl.
| | |
|---|---|
| *B29C 65/00* | (2006.01) |
| *B65B 41/16* | (2006.01) |
| *B65B 51/30* | (2006.01) |
| *B65B 61/00* | (2006.01) |
| *B65B 61/06* | (2006.01) |
| *B65D 75/00* | (2006.01) |
| *B65B 9/22* | (2006.01) |
| *B65D 30/20* | (2006.01) |
| *B29C 65/02* | (2006.01) |

(52) U.S. Cl.
CPC ........ *B29C 66/244* (2013.01); *B29C 66/4312* (2013.01); *B29C 66/43129* (2013.01); *B29C 66/849* (2013.01); *B65B 9/2042* (2013.01); *B65B 9/22* (2013.01); *B65B 41/16* (2013.01); *B65B 51/303* (2013.01); *B65B 61/005* (2013.01); *B65B 61/06* (2013.01); *B65D 31/10* (2013.01); *B65D 75/008* (2013.01); *B29C 65/02* (2013.01); *B29C 66/4322* (2013.01); *B29C 66/71* (2013.01); *B29C 66/72321* (2013.01); *B29C 66/72328* (2013.01); *B29C 2795/00* (2013.01); *B65B 9/2028* (2013.01)

(58) Field of Classification Search
USPC ........................................................ 383/107
See application file for complete search history.

(56) References Cited

U.S. PATENT DOCUMENTS

| | | | | |
|---|---|---|---|---|
| 3,534,666 A * | 10/1970 | Maccherone | ......... | B31B 70/642 493/203 |
| 3,537,360 A * | 11/1970 | Farnam | .............. | B31B 70/00 493/203 |
| 3,555,974 A * | 1/1971 | Davis Jr. | .............. | B31B 70/148 493/203 |
| 3,575,090 A * | 4/1971 | Hook | ............... | B29C 66/81417 493/203 |
| 3,620,884 A * | 11/1971 | Peterson | ............ | B29C 65/305 156/251 |
| 3,765,309 A * | 10/1973 | Joice | ............... | B31B 70/00 493/203 |
| 3,857,329 A * | 12/1974 | Lehmacher | ........ | B31B 70/864 493/203 |
| 3,915,077 A * | 10/1975 | LaFleur | ............ | B29C 66/0044 493/239 |
| 4,442,656 A * | 4/1984 | Wylie, Sr. | ............ | B65B 9/2042 53/552 |
| 4,453,370 A * | 6/1984 | Titchenal | ............ | B65D 33/002 493/929 |
| 4,524,459 A * | 6/1985 | Titchenal | ............ | B65D 31/00 383/122 |
| 4,571,235 A * | 2/1986 | Benoit | ................ | B31B 70/645 493/203 |
| 4,652,253 A * | 3/1987 | Benoit | ................ | B31B 70/872 493/239 |
| 4,655,737 A * | 4/1987 | Benoit | ................ | B31B 70/00 493/203 |
| 4,770,289 A * | 9/1988 | Ganz | ................. | B65B 21/245 269/274 |
| 4,816,104 A * | 3/1989 | Benoit | ................ | B65D 33/065 156/251 |
| 4,838,977 A * | 6/1989 | Ebmeyer | ........... | B31B 70/00 493/203 |
| 5,024,645 A * | 6/1991 | Soubrier | ............ | B29C 65/02 227/111 |
| 5,149,201 A * | 9/1992 | Benoit | ................ | B65D 33/065 383/8 |
| 5,219,220 A * | 6/1993 | Kucera | .............. | B65D 33/065 383/903 |
| 5,312,031 A * | 5/1994 | Thelen | .............. | B65B 41/12 53/389.5 |
| 5,336,143 A * | 8/1994 | Wu | ..................... | A63B 21/157 482/52 |
| 5,377,474 A * | 1/1995 | Kovacs | .............. | B65B 9/2028 53/64 |
| 5,393,143 A * | 2/1995 | Muhs | ................. | B65D 31/04 383/111 |
| 5,465,558 A * | 11/1995 | Dreger | .............. | B65B 9/20 53/551 |
| 5,505,040 A * | 4/1996 | Janssen | ............. | B65B 39/14 53/551 |
| 5,570,569 A * | 11/1996 | Masuda | ............. | B65B 9/213 53/372.2 |
| 5,685,132 A * | 11/1997 | Romijn | ............. | B65B 9/20 53/551 |
| 5,732,532 A * | 3/1998 | Fujisaki | ............ | B65B 9/213 141/10 |
| 5,836,143 A | 11/1998 | Yoshida et al. | | |
| 5,852,919 A * | 12/1998 | Matsuda | ........... | B65B 61/28 53/551 |
| 5,941,643 A * | 8/1999 | Linkiewicz | ........ | B65D 33/2533 383/906 |
| 6,021,621 A * | 2/2000 | Linkiewicz | ........... | B65B 61/188 53/139.2 |
| 6,038,839 A * | 3/2000 | Linkiewicz | ....... | B29C 66/81427 156/499 |
| 6,095,687 A * | 8/2000 | Dematteis | ......... | B29C 66/81427 383/104 |
| 6,101,784 A * | 8/2000 | Schoen | ................ | B65B 25/002 53/64 |
| 6,250,048 B1 | 6/2001 | Linkiewicz | | |
| 6,319,184 B1 * | 11/2001 | DeMatteis | .............. | B29C 66/80 493/190 |
| 6,481,183 B1 * | 11/2002 | Schmidt | ............ | B65D 33/2525 53/139.2 |
| 6,510,673 B1 * | 1/2003 | Visona' | .................. | B65B 9/2049 493/215 |
| 6,640,519 B1 * | 11/2003 | Goodwin | .................. | B65B 9/20 53/139.2 |
| 6,679,034 B2 | 1/2004 | Kohl et al. | | |
| 6,695,757 B2 * | 2/2004 | Edwards | ................ | B65D 33/06 493/51 |
| 6,698,164 B2 * | 3/2004 | Trani | ....................... | B31B 70/00 53/450 |
| 6,722,106 B2 | 4/2004 | Bartel et al. | | |
| 6,729,109 B2 | 5/2004 | Knoerzer et al. | | |
| 6,746,388 B2 * | 6/2004 | Edwards | ................ | B65D 33/16 493/51 |
| 6,805,660 B1 | 10/2004 | Finch | | |
| 6,817,160 B2 | 11/2004 | Schmidt | | |
| 6,860,084 B2 | 3/2005 | Knoerzer et al. | | |
| 6,886,313 B2 | 5/2005 | Knoerzer et al. | | |
| 6,918,699 B2 * | 7/2005 | Hanson | .................. | B65D 33/02 383/17 |
| 6,935,086 B2 | 8/2005 | Brenkus et al. | | |
| 6,957,915 B2 | 10/2005 | Tankersley | | |
| 7,032,362 B2 | 4/2006 | Dierl et al. | | |
| 7,065,937 B2 | 6/2006 | Tankersley | | |
| 7,144,358 B2 | 12/2006 | Visona et al. | | |
| 7,156,556 B2 | 1/2007 | Takahashi | | |
| 7,178,313 B2 | 2/2007 | Bezek et al. | | |
| 7,197,859 B2 | 4/2007 | Knoerzer et al. | | |
| 7,213,385 B2 | 5/2007 | Knoerzer et al. | | |
| 7,254,930 B2 | 8/2007 | Bartel et al. | | |
| 7,299,608 B2 | 11/2007 | Kohl et al. | | |
| 7,305,805 B2 | 12/2007 | Dierl et al. | | |
| 7,396,163 B2 | 7/2008 | McGregor | | |
| 7,490,451 B2 * | 2/2009 | Matthews | ............ | B65B 9/2042 53/139.2 |
| 7,500,340 B2 | 3/2009 | Kohl et al. | | |
| 7,516,596 B2 | 4/2009 | Henderson et al. | | |
| 7,552,574 B2 | 6/2009 | Gehring et al. | | |

(56) References Cited

U.S. PATENT DOCUMENTS

| | | |
|---|---|---|
| 8,132,395 B2 | 3/2012 | Gehring et al. |
| 8,277,121 B2 | 10/2012 | Bell et al. |
| 8,376,923 B2 | 2/2013 | Nakagawa et al. |
| 8,572,932 B2 | 11/2013 | Bierschenk et al. |
| 8,739,504 B2 | 6/2014 | Willey |
| 8,776,484 B2 * | 7/2014 | Kondo .................... B65B 9/207 |
| | | 493/437 |
| 9,227,745 B2 * | 1/2016 | Miyamoto ............. B29C 66/849 |
| 2003/0041564 A1 | 3/2003 | Schmidt |
| 2003/0054929 A1 * | 3/2003 | Post ....................... B31B 70/644 |
| | | 493/218 |
| 2003/0172624 A1 * | 9/2003 | Bartel ........................ B65B 9/20 |
| | | 53/451 |
| 2003/0172625 A1 | 9/2003 | Knoerzer et al. |
| 2003/0172626 A1 * | 9/2003 | Kohl .......................... B65B 9/22 |
| | | 53/552 |
| 2003/0179957 A1 * | 9/2003 | Tankersley ................ B65B 9/24 |
| | | 53/413 |
| 2004/0083685 A1 * | 5/2004 | Knoerzer ........... B65D 75/5811 |
| | | 53/551 |
| 2004/0091183 A1 | 5/2004 | Dierl et al. |
| 2004/0114838 A1 * | 6/2004 | McGregor ......... B65D 33/2533 |
| | | 383/66 |
| 2004/0159081 A1 | 8/2004 | Knoerzer et al. |
| 2004/0161174 A1 | 8/2004 | Bartel et al. |
| 2004/0198575 A1 * | 10/2004 | Finch ..................... B65D 31/08 |
| | | 493/218 |
| 2004/0226264 A1 | 11/2004 | Tankersley |
| 2004/0226265 A1 | 11/2004 | Tankersley |
| 2004/0226849 A1 | 11/2004 | Brenkus et al. |
| 2005/0069230 A1 * | 3/2005 | Takahashi ............ B65D 75/008 |
| | | 383/107 |
| 2005/0113233 A1 * | 5/2005 | Ferfolja ..................... B65B 9/20 |
| | | 493/7 |
| 2005/0115211 A1 | 6/2005 | Knoerzer et al. |
| 2005/0198929 A1 * | 9/2005 | Gehring ................... B65B 9/213 |
| | | 53/551 |
| 2005/0210840 A1 * | 9/2005 | Kohl ......................... B65B 59/04 |
| | | 53/551 |
| 2005/0238766 A1 * | 10/2005 | Henderson ................ B65B 9/22 |
| | | 426/106 |
| 2006/0064947 A1 * | 3/2006 | Bartel ................... B65D 75/008 |
| | | 53/551 |
| 2006/0126975 A1 * | 6/2006 | McKellar ................ B65B 61/02 |
| | | 383/200 |
| 2006/0140514 A1 | 6/2006 | Dierl et al. |
| 2006/0156696 A1 * | 7/2006 | Bezek ................. B65D 81/3261 |
| | | 53/450 |
| 2006/0196151 A1 | 9/2006 | Knoerzer et al. |
| 2006/0201111 A1 | 9/2006 | Tankersley |
| 2007/0062161 A1 * | 3/2007 | Dierl ................. B65D 75/5805 |
| | | 53/551 |
| 2007/0084142 A1 | 4/2007 | Matthews |
| 2007/0237434 A1 | 10/2007 | McKellar |
| 2008/0034713 A1 | 2/2008 | Kohl et al. |
| 2009/0162496 A1 | 6/2009 | Henderson et al. |
| 2009/0232424 A1 * | 9/2009 | Bierschenk ............ B65D 75/44 |
| | | 53/284.7 |
| 2010/0011711 A1 | 1/2010 | Gehring et al. |
| 2010/0084425 A1 * | 4/2010 | Bell ....................... B65B 83/06 |
| | | 222/1 |
| 2010/0210438 A1 * | 8/2010 | Nakagawa ........... B65B 51/306 |
| | | 493/186 |
| 2011/0019942 A1 | 1/2011 | Piraneo |
| 2011/0019943 A1 * | 1/2011 | Piraneo ................... B65D 31/10 |
| | | 493/243 |
| 2011/0083402 A1 * | 4/2011 | Walker .................. B65B 61/186 |
| | | 53/451 |
| 2011/0239592 A1 * | 10/2011 | Willey .................... B65B 61/16 |
| | | 53/450 |
| 2012/0055120 A1 * | 3/2012 | Bierschenk ........... B65B 51/146 |
| | | 53/551 |
| 2013/0071047 A1 * | 3/2013 | VanLoocke ............ B65D 33/16 |
| | | 53/469 |
| 2013/0130878 A1 | 5/2013 | Nakagawa et al. |
| 2014/0013705 A1 * | 1/2014 | May ...................... B65B 59/003 |
| | | 53/138.4 |
| 2014/0274629 A1 * | 9/2014 | Lykowski ............. B65B 61/188 |
| | | 493/17 |

FOREIGN PATENT DOCUMENTS

| | | |
|---|---|---|
| EP | 324739 | 4/1996 |
| EP | 648673 | 3/1998 |
| EP | 676329 | 5/1998 |
| EP | 976539 | 2/2000 |
| EP | 1086899 | 3/2001 |
| EP | 819605 | 1/2002 |
| EP | 1001901 | 4/2003 |
| EP | 761536 | 8/2003 |
| EP | 1264768 | 9/2004 |
| EP | 1459995 | 9/2004 |
| EP | 1609720 | 8/2007 |
| EP | 1776277 | 3/2008 |
| EP | 2218647 | 7/2011 |
| EP | 1954567 | 3/2012 |
| EP | 1501737 | 1/2013 |
| EP | 2567899 | 3/2013 |
| EP | 1485295 | 8/2013 |
| EP | 2334477 | 4/2014 |
| EP | 2607243 | 6/2014 |
| GB | 1009612 | 11/1965 |
| WO | 98/33709 | 8/1998 |
| WO | 99/64307 | 12/1999 |
| WO | 03/051730 | 6/2003 |
| WO | 03/089304 | 10/2003 |
| WO | 2005/044665 | 5/2005 |
| WO | 2006/076331 | 7/2006 |
| WO | 2007/058689 | 5/2007 |
| WO | 2009/023894 | 2/2009 |
| WO | 2009/114386 | 9/2009 |
| WO | 2013/032762 | 3/2013 |

\* cited by examiner

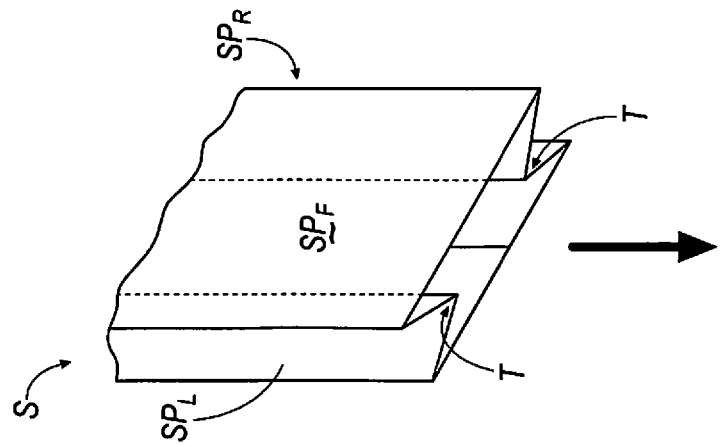
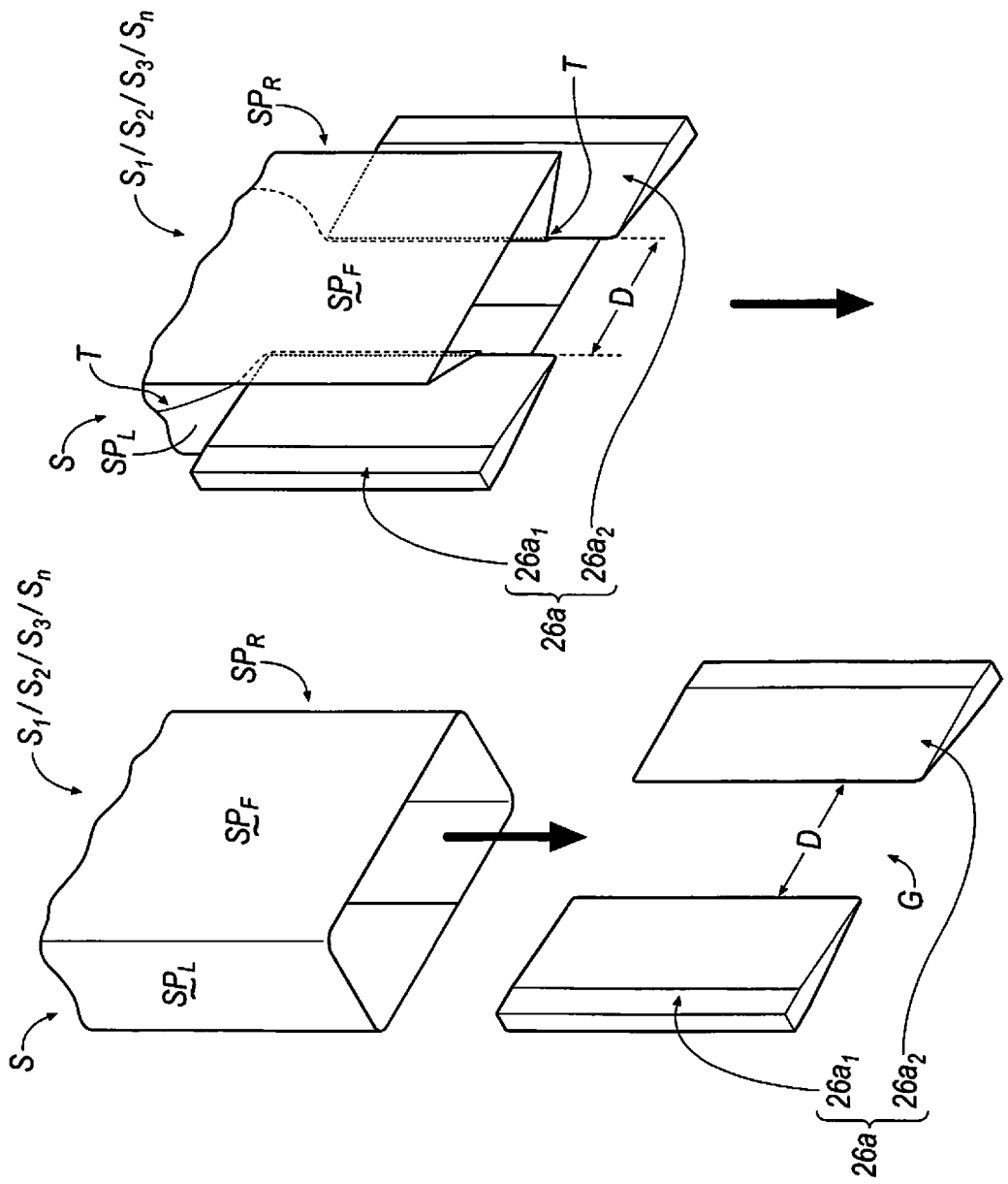
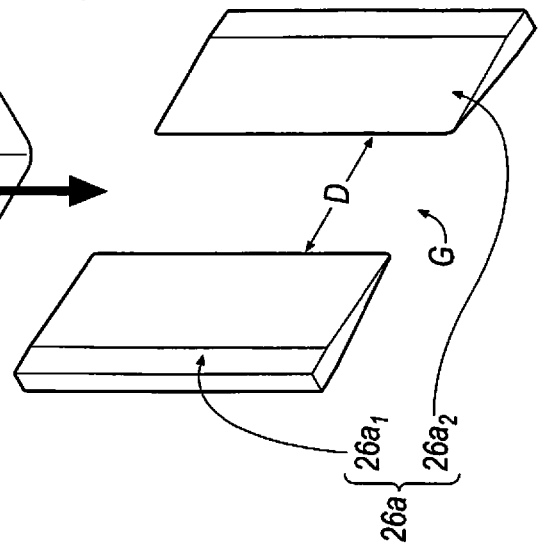
FIG. 4C
FIG. 4B
FIG. 4A

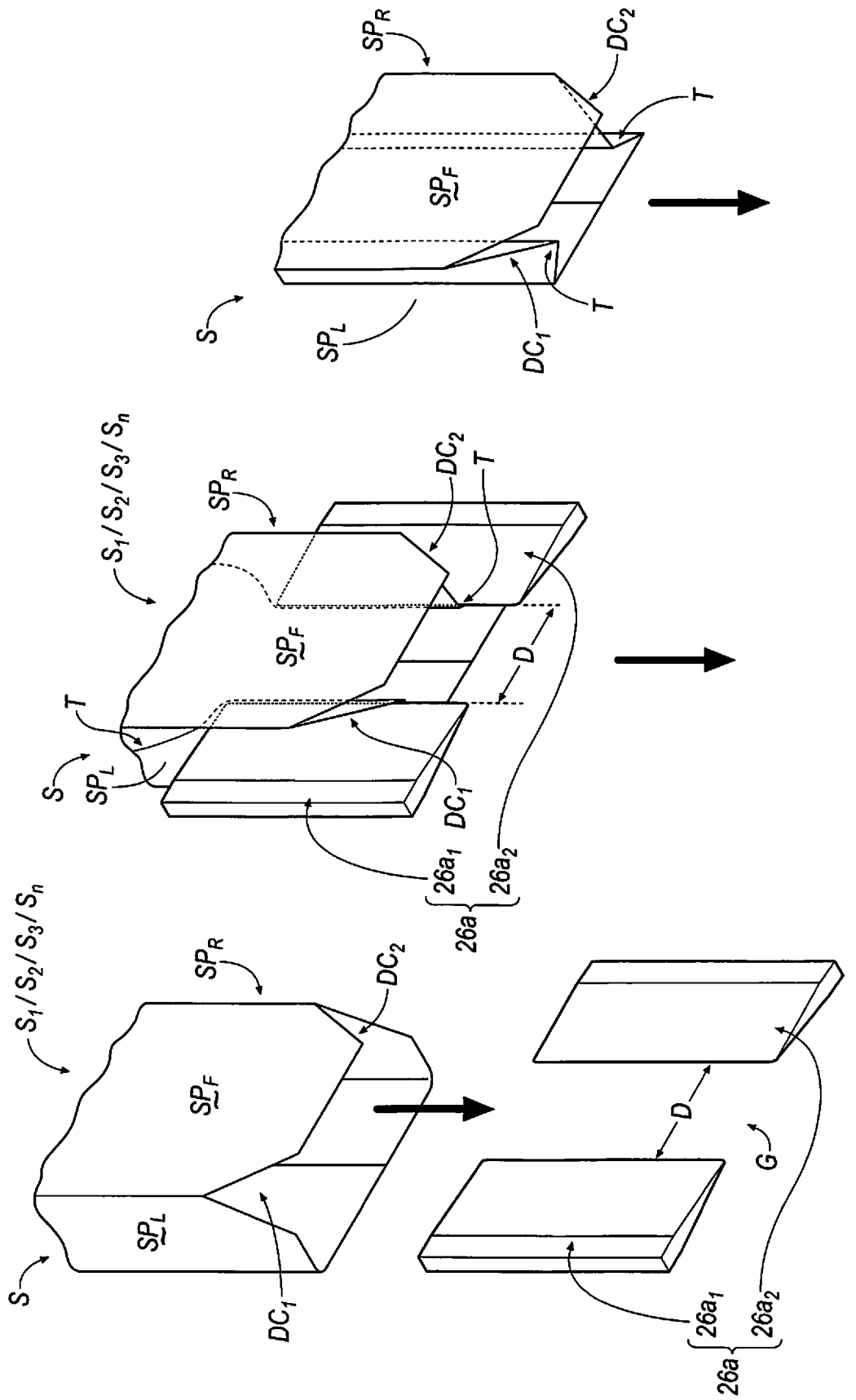

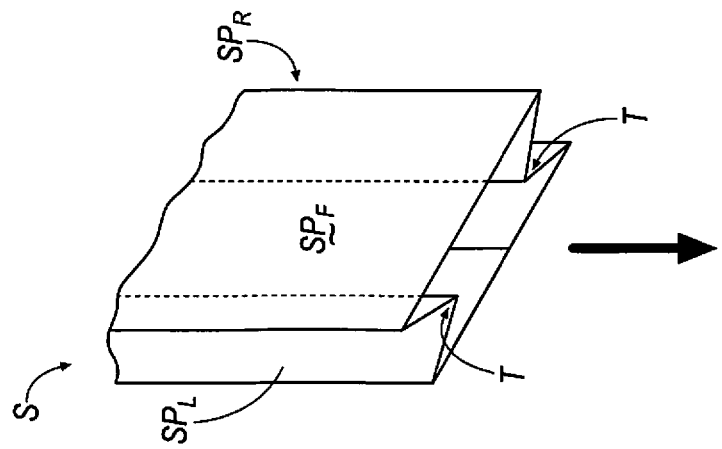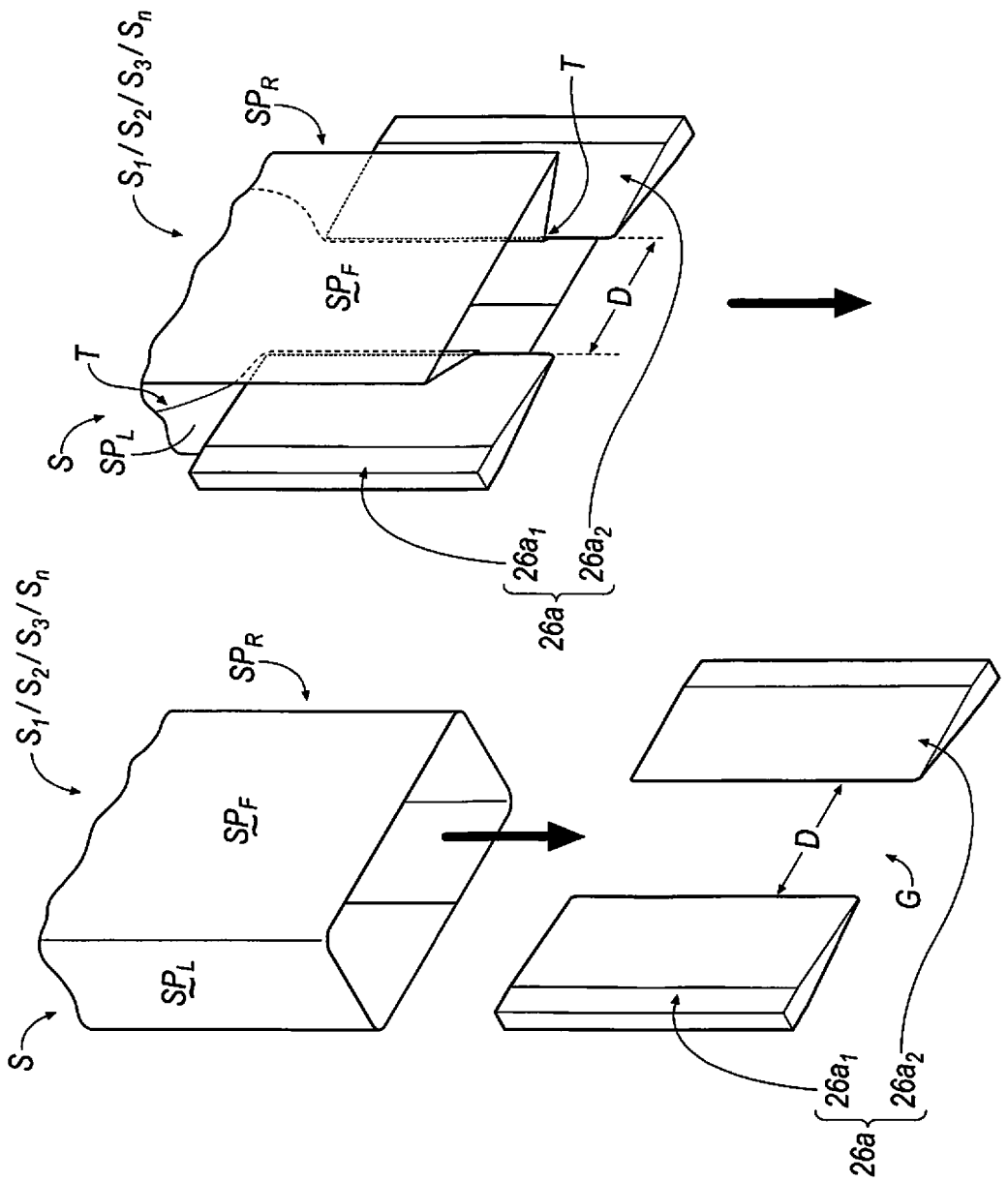
FIG. 15C
FIG. 15B
FIG. 15A

FLAT-BOTTOM STAND-UP BAG, VERTICAL FORM, FILL, AND SEAL SYSTEM AND METHODOLOGY FOR UTILIZING THE SAME

CROSS REFERENCE TO RELATED APPLICATION

This application is a Divisional Application of U.S. patent application Ser. No. 15/066,801, filed Mar. 10, 2016, which claims the benefit under 35 U.S.C. § 119 of U.S. Provisional Application No. 62/134,877, filed Mar. 18, 2015. The entire contents of the aforementioned applications are hereby both incorporated by reference in their entirety.

TECHNICAL FIELD

This disclosure relates to a flat-bottom stand-up bag, a vertical form, fill, and seal (VFFS) system and a methodology for utilizing the same.

BACKGROUND

Flat-bottom stand-up bags typically contain deposited materials such as, for example, foodstuff (e.g., cereal, chips, popcorn, candy, nuts, or the like). Known flat-bottom stand-up bags include several design deficiencies that may result in, for example, an undesirable entrapment of the deposited material between folds of the material defining the bag, which may contribute to an imbalance of the bag. Such imbalances of the bag may result in the bag not being arranged in an upright orientation, thereby requiring an external structure such as a box or other fixture to ensure that the bag remains properly orientated on a display shelf. Without support from such an external structure, the bag may be susceptible to tipping over which, in turn, prevents a consumer from easily identifying the contents of the bag. While such external structures adequately support a bag on a display shelf, such structures add to the overall cost and complexity associated with packaging and displaying foodstuff.

SUMMARY

A vertical form fill and seal system is provided and includes a spindle that rotatably supports an elongated sheet of material defined by a plurality of material segments, whereby each of the plurality of material segments includes a first aperture and a second aperture formed through the sheet of material. The system additionally includes a forming tube sized for drawing a left edge and a right edge of the elongated sheet of material together in an overlapping configuration to form the elongated sheet of material into a substantially tube shape and a sealer sized for sealing the left edge and the right edge of the elongated sheet of material to one another to form a longitudinal seal. A gusseting mechanism is also provided and is sized for forming a gusseted tuck in each of a left sidewall panel portion of the substantially tube-shaped elongated sheet of material and a right sidewall panel portion of the substantially tube-shaped elongated sheet of material. A sealing mechanism folds and seals a first segment of the plurality of material segments at the first aperture and at the second aperture to provide an end wall of the first segment with a substantially flat, rectangular-shaped footprint.

In one configuration, the system additionally includes a cutting mechanism that severs the first segment from a second segment located downstream from the first segment. The cutting mechanism severs the first segment at an opposite end of the first segment than the end wall following formation of the end wall to sever the first segment from a third segment located upstream from the first segment.

In one configuration, the cutting mechanism and the sealing mechanism form an integrated machine. The integrated machine may include a substantially "K" shape.

In one configuration, the cutting mechanism and the sealing mechanism cooperate to provide a sealed edge at the end wall that has a pair of legs extending from a cross member that joins the pair of legs. The legs extend from the cross member at an obtuse angle and away from one another.

In one configuration, the cutting mechanism and the sealing mechanism cooperate to provide a sealed edge at the end wall that has a substantially "U" shape.

In one configuration, the first aperture and the second aperture include a substantially triangular shape, whereby the triangular shape has a base that is substantially coplanar with an outer edge of the first segment. Additionally or alternatively, the first aperture is formed through the left sidewall portion and the second aperture is formed through the right sidewall portion.

In one configuration, the first aperture includes an edge that is substantially coplanar with an outer edge of the first segment.

In another configuration, a vertical form fill and seal (VFFS) system is provided and includes a support rod that rotatably supports an elongated sheet of material defined by a plurality of material segments and a forming tube sized for drawing a left edge and a right edge of the elongated sheet of material together in an overlapping configuration to form the elongated sheet of material into a substantially tube shape. The VFFS also includes a sealer sized for sealing the left edge and the right edge of the elongated sheet of material to one another and a gusseting mechanism sized for forming a gusseted tuck in each of a left sidewall panel portion of the substantially tube-shaped elongated sheet of material and a right sidewall panel portion of the substantially tube-shaped elongated sheet of material. A cutting mechanism removes a first portion and a second portion of a first segment of the plurality of material segments in order to form a first cut and a second cut in the first segment and a sealing mechanism folds and seals the first segment at the first cut and at the second cut to provide an end wall of the first segment with a substantially flat, rectangular-shaped footprint.

In one configuration, a cutter severs the first segment from a second segment located downstream from the first segment following formation of the end wall of the first segment. The cutter severs the first segment at an opposite end of the first segment than the end wall following formation of the end wall to sever the first segment from a third segment located upstream from the first segment.

In one configuration, the cutting mechanism is disposed upstream from the forming tube. In another configuration, the cutting mechanism is disposed downstream from the forming tube. Regardless of the location of the cutting mechanism, the first portion and the second portion may include a substantially triangular shape.

In one configuration, the cutting mechanism and the sealing mechanism form an integrated machine. The integrated machine may include a substantially "K" shape.

In one configuration, the cutting mechanism and the sealing mechanism cooperate to provide a sealed edge at the end wall that has a pair of legs extending from a cross member that joins the pair of legs, the legs extending from the cross member at an obtuse angle and away from one another. The cutting mechanism and the sealing mechanism may cooperate to provide a sealed edge at the end wall that has a substantially "U" shape.

In another configuration, a method is provided and includes rotatably supporting an elongated sheet of material defined by a plurality of material segments, drawing a left edge and a right edge of the elongated sheet of material together in an overlapping configuration around a forming tube to form the elongated sheet of material into a substantially tube shape, and sealing the left edge and the right edge of the elongated sheet of material to one another. The method also includes forming a gusseted tuck in each of a left sidewall panel portion of the substantially tube-shaped elongated sheet of material and a right sidewall panel portion of the substantially tube-shaped elongated sheet of material and removing by a cutting mechanism a first portion and a second portion of a first segment of the plurality of material segments in order to form a first cut and a second cut in the first segment. A sealing mechanism folds and seals the first segment at the first cut and at the second cut to provide an end wall of the first segment with a substantially flat, rectangular-shaped footprint.

In one configuration, the method may additionally include severing by the cutting mechanism the first segment from a second segment located downstream from the first segment following formation of the end wall of the at first segment. The method may also include severing by the cutting mechanism the first segment at an opposite end of the first segment than the end wall following formation of the end wall to sever the first segment from a third segment located upstream from the first segment.

In one configuration, removing the first portion and the second portion includes removing the first portion and the second portion upstream from the forming tube. In another configuration, removing the first portion and the second portion includes removing the first portion and the second portion downstream from the forming tube.

In one configuration, removing the first portion and the second portion includes removing a substantially triangular shaped piece of material from the sheet of material.

In one configuration, the folding and sealing provides a sealed edge at the end wall that has a pair of legs extending from a cross member that joins the pair of legs. Providing the sealed edge having the pair of legs and the cross member includes extending the legs from the cross member at an obtuse angle and away from one another.

In one configuration, the folding and sealing provides a sealed edge at the end wall that has a substantially "U" shape.

In another configuration, a bag is provided and includes a front sidewall panel portion having a first end including a first cross member extending between and connecting a first edge and a second edge to provide the first end with a substantially "U" shape. The bag also includes a rear sidewall panel portion having a second end including a second cross member extending between and connecting a third edge and a fourth edge to provide the second end with a substantially "U" shape, whereby the second cross member is attached to the first cross member to create a first sealed joint between the front sidewall panel portion and the rear sidewall panel portion. A right sidewall panel portion extends between and connects the front sidewall panel portion and the rear sidewall panel portion at the first edge and the third edge to create a second sealed joint at a junction of the right sidewall panel portion and the first edge and a third sealed joint at a junction of the right sidewall panel portion and the third edge. A left sidewall panel portion extends between and connects the front sidewall panel portion and the rear sidewall panel portion at the second edge and the fourth edge to create a fourth sealed joint at a junction of the left sidewall panel portion and the second edge and a fifth sealed joint at a junction of the left sidewall panel portion and the fourth edge.

In one configuration, the front sidewall panel portion is folded at a location along a length of the first edge and the second edge to cause the first cross member to oppose a surface of the front sidewall panel portion. The first edge and the second edge may be deformed at the fold to maintain the folded nature of the first edge and the second edge. In one configuration, the first edge and the second edge receive the application of at least one of heat and pressure at the fold to maintain the folded nature of the first edge and the second edge.

In one configuration, the first edge and the second edge extend from the first cross member at an obtuse angle and in opposite directions from one another. Similarly, the third edge and the fourth edge also extend from the second cross member at an obtuse angle and in opposite directions from one another. In another configuration, the third edge and the fourth edge extend from the second cross member at an obtuse angle and in opposite directions from one another independent from the configuration of the first edge and the second edge.

In one configuration, the second sealed joint and the third sealed joint terminate at the first sealed joint. Similarly, the fourth sealed joint and the fifth sealed joint terminate at the first sealed joint. In so doing, the first sealed joint cooperates with the second sealed joint and the fourth sealed joint to provide the first end with a continuous, sealed joint extending along the first edge, the second edge, and the first cross member. Likewise, the first sealed joint cooperates with the third sealed joint and the fifth sealed joint to provide the second end with a continuous, sealed joint extending along the third edge, the fourth edge, and the second cross member.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4A is a perspective view of a portion of a finishing station of the VFFS system of FIG. 1A and a portion of a segment of the elongated sheet of material of FIG. 3 that is formed by the VFFS to be in a substantially cylindrical or tube shape.

FIG. 4B is another perspective view of the portion of a finishing station of the VFFS system of FIG. 4A and the portion of the segment of the elongated sheet of material of FIG. 4A.

FIG. 4C is a perspective view of the segment of the elongated sheet of material of FIG. 4B.

FIG. 10A is a perspective view of a portion of a finishing station of the VFFS system of FIG. 9A and a portion of a segment of the elongated sheet of material of FIG. 3 that is formed by the VFFS to be in a substantially cylindrical or tube shape.

FIG. 10B is another view of the portion of a finishing station of the VFFS system of FIG. 10A and the portion of the segment of the elongated sheet of material of FIG. 10A.

FIG. 10C is a perspective view of the segment of the elongated sheet of material of FIG. 10B.

FIG. 15A is a perspective view of a portion of a finishing station of the VFFS system of FIG. 14A and a portion of a segment of the elongated sheet of material of FIG. 3 that is formed by the VFFS to be in a substantially cylindrical or tube shape.

FIG. 15B is another perspective view of the portion of a finishing station of the VFFS system of FIG. 15A and the portion of the segment of the elongated sheet of material of FIG. 15A.

FIG. 15C is a perspective view of the segment of the elongated sheet of material of FIG. 15B.

Like reference symbols in the various drawings indicate like elements.

DETAILED DESCRIPTION

A flat-bottom stand-up bag may be formed from an elongated sheet of material that is interfaced with a vertical form, fill, and seal (VFFS) system. The VFFS system may be utilized, for example, in the food production industry for depositing foodstuff (e.g., cereal, chips, popcorn, candy, nuts, or the like) into the flat-bottom stand-up bag. The VFFS system includes a finishing station that forms a lower end of the flat-bottom stand-up bag and may include at least one of, for example: (1) a gusseting mechanism for forming gussets along opposing sides of the flat-bottom stand-up bag; (2) a cutting mechanism that removes portions of material from the elongated sheet of material that forms the flat-bottom stand-up bag; and (3) a sealing mechanism that shapes and seals the lower end of the flat-bottom stand-up bag and an upper end of a subsequent flat-bottom stand-up bag.

Figure 1A:
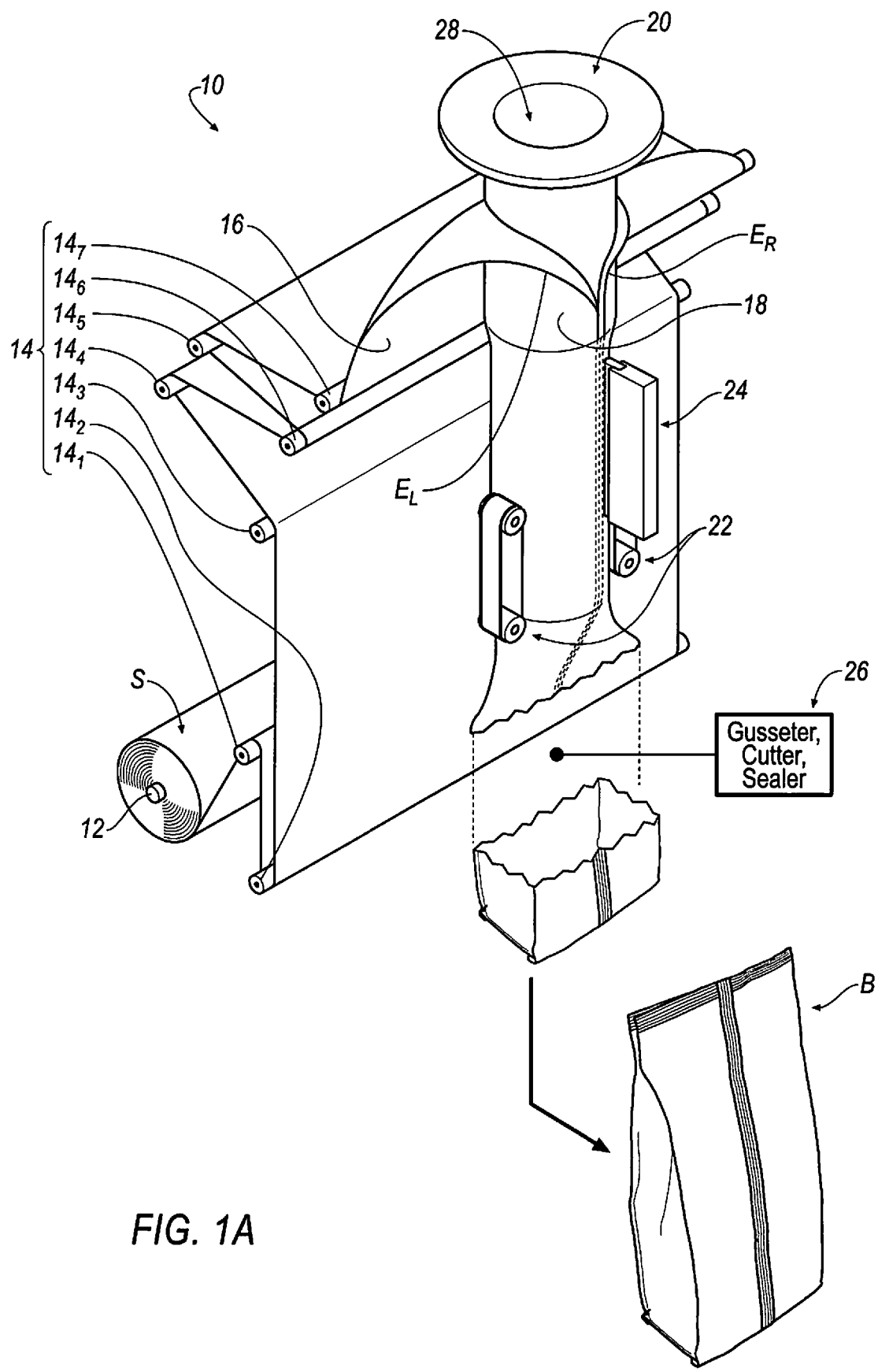
FIG. 1A is a perspective view of an exemplary vertical form, fill and seal (VFFS) system.

Referring to FIG. 1A, in some implementations, a VFFS system 10 includes a plurality of connected components/stations 12-26. The plurality of connected components/stations 12-26 include, for example: a support rod or spindle 12; a plurality of tensioners 14; a sheet guide 16; a vertically-arranged forming tube 18; a product delivery cylinder 20; a pair of spaced-apart drive belts 22; a vertical sealer 24; and a finishing station 26. The VFFS system 10 is shown in simplified form and does not illustrate, for example, one or more of: a supporting structure and an enclosure. Therefore, even in the absence of illustrating the supporting structure and the enclosure, the above described plurality of connected components/stations 12-26 of the VFFS system 10 may be said to be connected to one another due to the fact that the above-described components 12-26 of the VFFS system 10 are connected to one or more of the not-illustrated supporting structure and the enclosure. Alternatively, the plurality of connected components/stations 12-26 of the VFFS system 10 may be said to be connected together, or are in communication with one another upon interfacing an elongated sheet of material S with the plurality of interconnected components/stations 12-26 of the VFFS system 10. The elongated sheet of material S may be, for example, a packaging film, such as: polypropylene; polyester; paper; polyolefin extrusions; adhesive laminates; and other such materials; or from layered combinations of the above. If the deposited material is foodstuff, the elongated sheet of material S may include an innermost metalized layer that assists in the retention of, for example, flavor of the foodstuff.

As seen in FIG. 1A, the elongated sheet of material S is initially arranged in the form of a wound roll that is rotatably supported on the support rod 12. The wound roll of the elongated sheet of material S is reeled off of the support rod 12 and subsequently interfaced with the remaining plurality of connected components/stations 12-26 of the VFFS system 10. As will be described, the VFFS system 10 spatially and physically manipulates the elongated sheet of material S from a first orientation in the form of a substantially planar sheet (as seen, for example, when the elongated sheet of material S is located about the plurality of tensioners 14) to a final orientation in the form of a three-dimensional end product defining a flat-bottom stand-up bag, B.

As seen in, for example, FIGS. 6, 7, and 8A-8D, the flat-bottom stand-up bag B is defined by an enclosed end wall EW having a substantially flat, rectangular-shaped footprint. The substantially flat, rectangular-shaped footprint assists in maintaining the flat-bottom stand-up bag B in an upright orientation, and, therefore inhibits the flat-bottom stand-up bag B from tipping over once the flat-bottom stand-up bag B is located upon a display shelf, for example. Further, the substantially flat, rectangular-shaped footprint also contributes to the formation of the flat-bottom stand-up bag B. In addition, the substantially flat, rectangular-shaped footprint also contributes to having a spatial geometry that inhibits an undesirable entrapment of the deposited material (e.g., foodstuff) between folds of material defining the flat-bottom stand-up bag B near the enclosed end wall EW of the flat-bottom stand-up bag, B. By preventing the entrapment of the deposited material between folds of material defining the flat-bottom stand-up bag B near the enclosed end wall, the flat-bottom stand-up bag B is further inhibited from tipping over once the flat-bottom stand-up bag B is located upon a display shelf or other flat surface.

Figure 2:
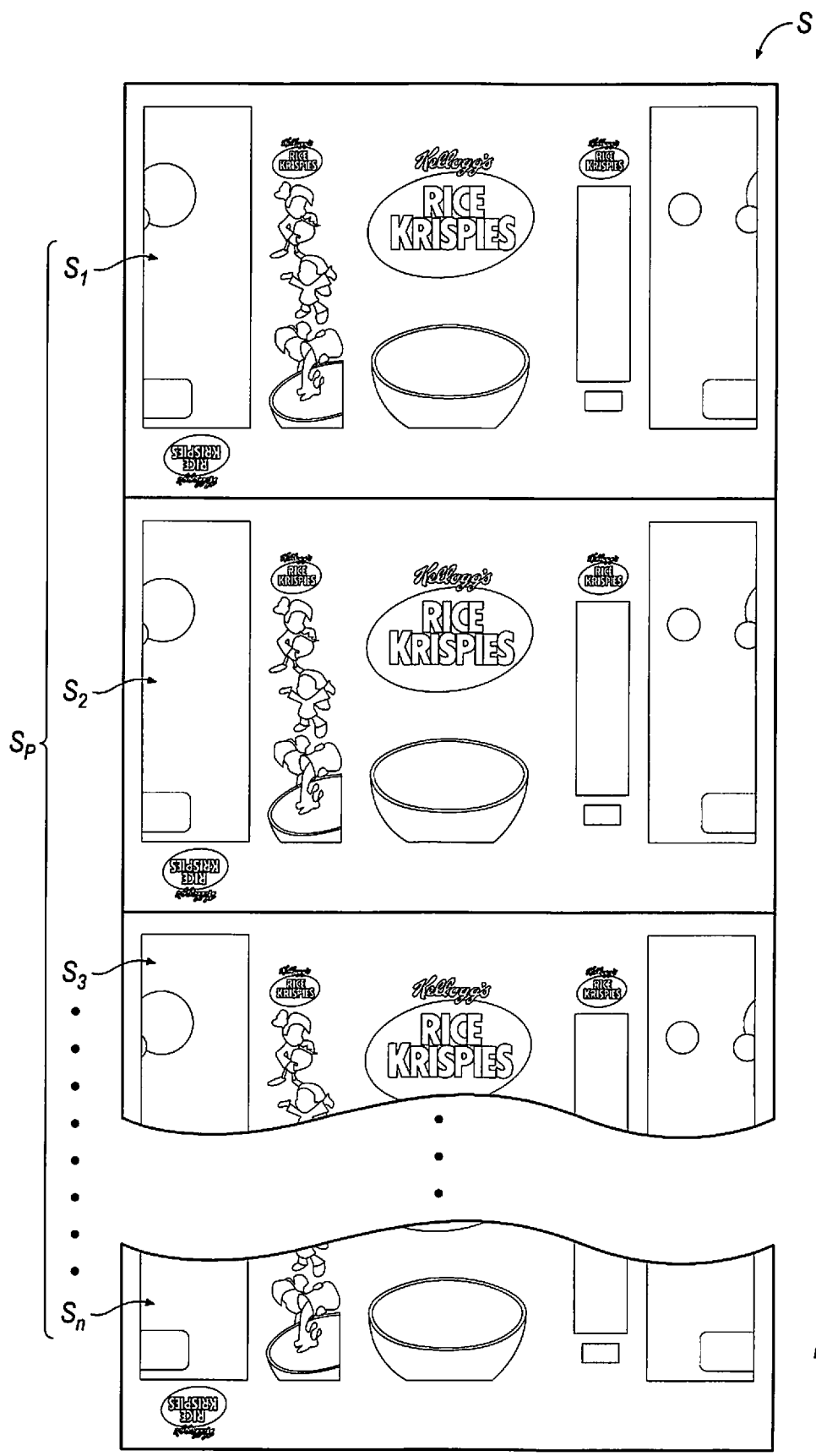
FIG. 2 is a top view of an exemplary elongated sheet of material including a plurality of segments each defining a unit of material that will form an exemplary flat-bottom stand-up bag.

Referring to FIG. 2, an exemplary elongated sheet of material S includes a plurality of segments $S_P$ defined by, for example, a first segment $S_1$ a second segment $S_2$ a third segment $S_3$ and an "$n^{th}$" segment $S_n$ (where n is an integer greater or equal to 1 (n≥1)). Although four segments (i.e., the first segment $S_1$ the second segment $S_2$ the third segment $S_3$ and the "$n^{th}$" segment $S_n$) are shown and described at FIG. 2, the elongated sheet of material S is exemplary and not limited to any particular number of segments. Portions of an exemplary segment of the plurality of segments $S_P$ is described at FIG. 3.

Figure 3:
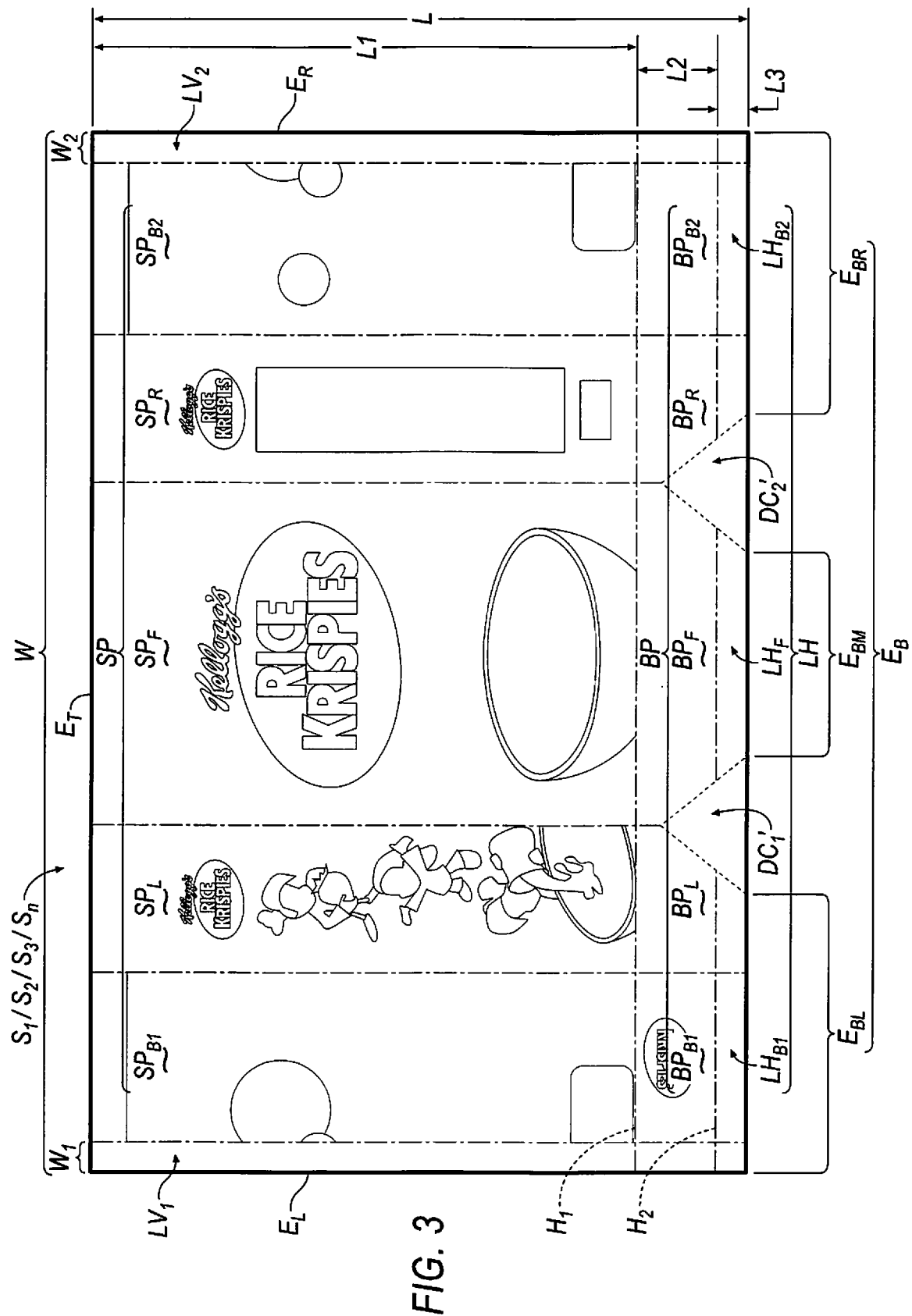
FIG. 3 is a top view of a segment of the elongated sheet of material of FIG. 2 that will form an exemplary flat-bottom stand-up bag.
Figure 5A:
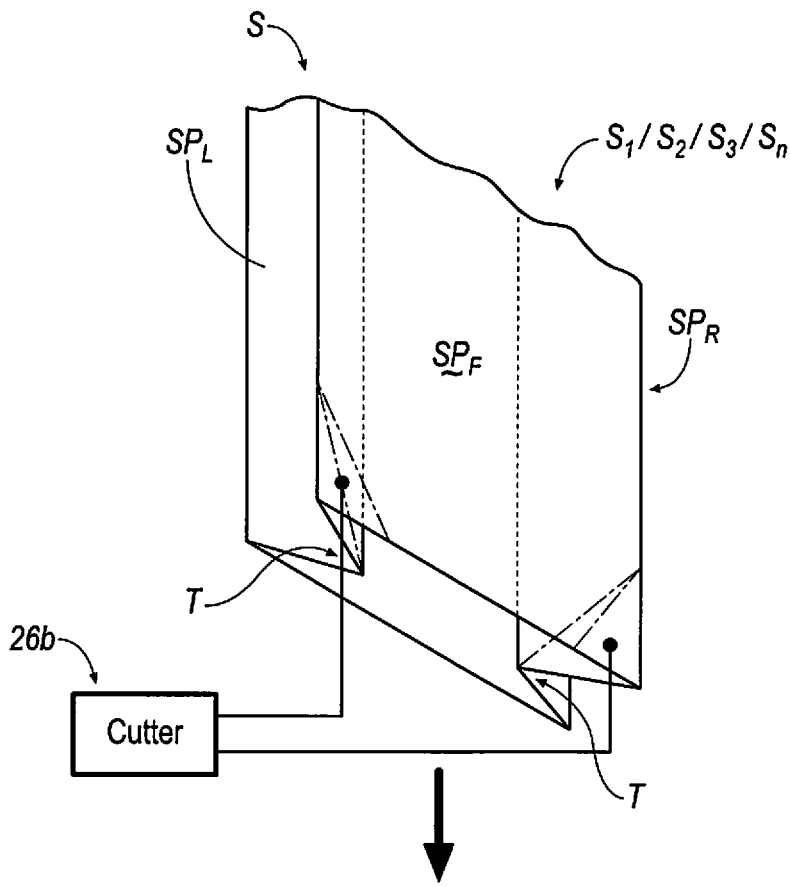
FIG. 5A is a perspective view of a portion of a finishing station of the VFFS system of FIG. 1A and the portion of the segment of the elongated sheet of material of FIG. 4C.
Figure 5B:
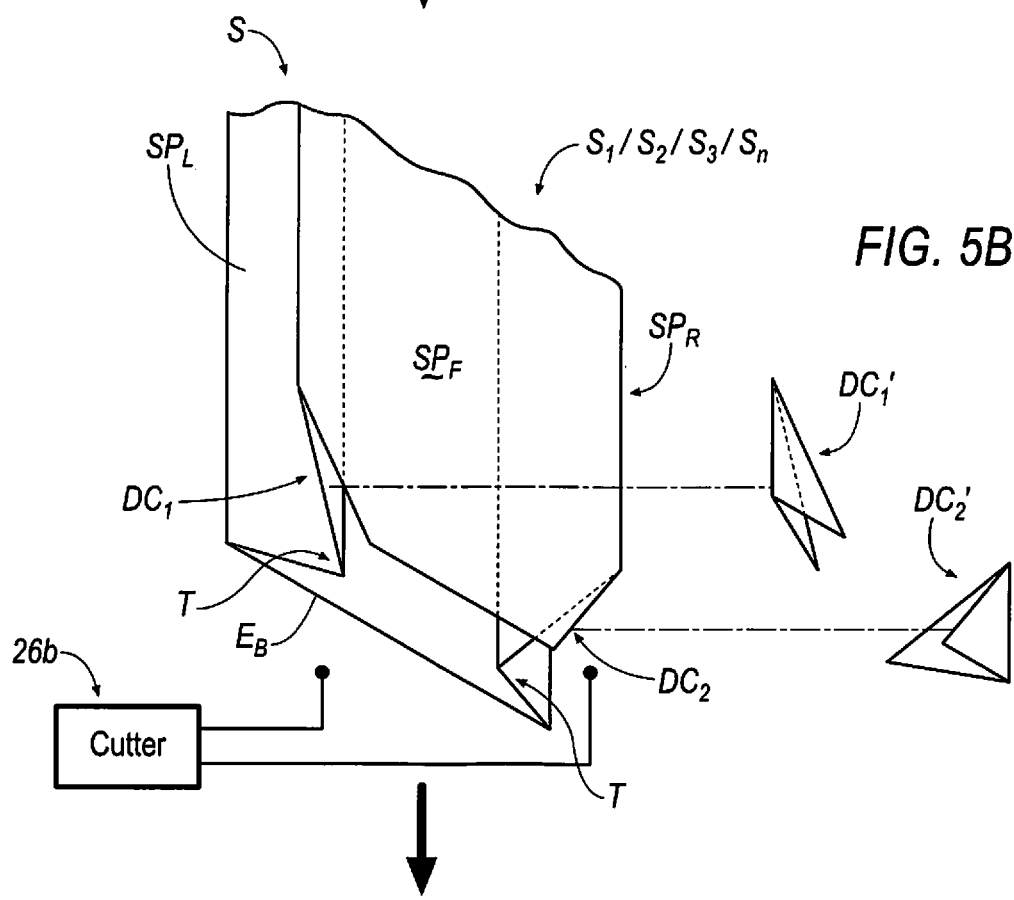
FIG. 5B is a perspective view of the portion of a finishing station of the VFFS system of FIG. 5A and the portion of the segment of the elongated sheet of material of FIG. 5A.

As shown in FIG. 3, all of the material defining each segment $S_1/S_2/S_3/S_n$ is utilized for forming the flat-bottom stand-up bag B except for a first substantially triangular cut section $DC_1'$ (see also, e.g., FIG. 5B) and a second substantially triangular cut section $DC_2'$ (see also, e.g., FIG. 5B). As shown in FIG. 5B, the first substantially triangular cut section $DC_1'$, and the second substantially triangular cut section $DC_2'$, are removed from each segment $S_1/S_2/S_3/S_n$ during the manufacture of the flat-bottom stand-up bag B by the VFFS system 10.

With reference to FIG. 3, after forming the first substantially triangular cut section $DC_1'$ and the second substantially triangular cut section $DC_2'$ each segment $S_1/S_2/S_3/S_n$ is defined by a length L and a width W. The width W is bound by a left edge $E_L$ and a right edge $E_R$. The length L is bound by a top edge $E_T$ and a bottom edge $E_B$. As a result of the formation of the first cut section $DC_1'$ and the second cut section $DC_2'$ the bottom edge $E_B$ is defined by a left bottom edge portion $E_{BL}$ a middle bottom edge portion $E_{BM}$ and a right bottom edge portion $E_{BR}$.

The length L includes a first length segment L1 a second length segment L2 and a third length segment L3. The first length segment L1 is bound by the top edge $E_T$ and a first horizontal dashed line $H_1$ that extends across the width, W. The second length segment L2 is bound by the first horizontal dashed line $H_1$ and a second horizontal dashed line $H_2$ that extends across the width W. The third length segment L3 is bound by the second horizontal dashed line $H_2$ and the bottom edge $E_B$.

The first length segment L1 defines a length of a plurality of sidewall panel portions SP of the flat-bottom stand-up bag B. A plurality of vertical dashed lines are shown extending across the length L in order to distinguish the plurality of sidewall panel portions SP of the flat-bottom stand-up bag B from one another. The plurality of sidewall panel portions SP may include, for example: a front sidewall panel portion $SP_F$; a left sidewall panel portion $SP_L$; a right sidewall panel portion $SP_R$; a first half of a back sidewall panel portion $SP_{B1}$; and a second half of the back sidewall panel portion $SP_{B2}$.

The second length segment L2 generally defines a length of a plurality of bottom panel portions BP of the flat-bottom stand-up bag B. The plurality of dashed lines extending across the length L distinguishes the plurality of bottom panel portions BP of the flat-bottom stand-up bag B from one another. The plurality of bottom panel portions BP of the flat-bottom stand-up bag B may include, for example: a front bottom panel portion $BP_F$; a left bottom panel portion $BP_L$; a right bottom panel portion $BP_R$; a first half of a back bottom panel portion $BP_{B1}$; and a second half of the back bottom panel portion $BP_{B2}$.

The third length segment L3 generally defines a length of a plurality of horizontally sealable lip portions LH of the flat-bottom stand-up bag B. The plurality of horizontally sealable lip portions LH of the flat-bottom stand-up bag B include: a front horizontally sealable lip portion $LH_F$; a first half of a back horizontally sealable lip portion $LH_{B1}$; and a second half of the back horizontally sealable lip portion $LH_{B2}$.

All of the length L and a first portion $W_1$ of the width W extending from the left edge $E_L$ forms a first half a vertically-sealable lip portion $LV_1$. All of the length L and a second portion $W_2$ of the width W extending from the right edge $E_R$ forms a second half of the vertically sealable lip portion $LV_2$.

Figure 20:
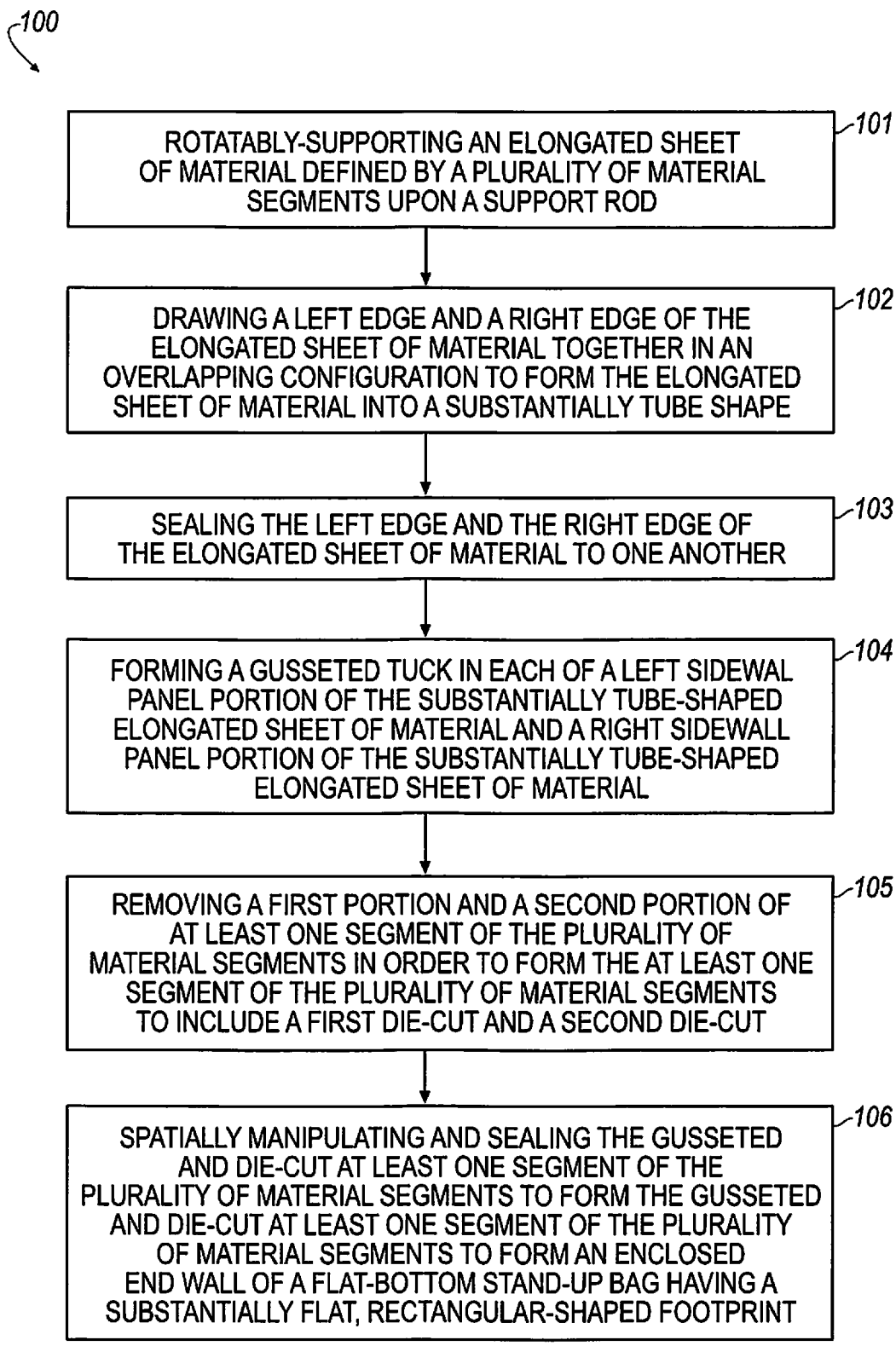
FIG. 20 is a flow diagram of an exemplary method for forming a flat-bottom stand-up bag from the elongated sheet of material including the plurality of segments of FIG. 2.

Referring back to FIG. 1A, an exemplary method (see also, e.g., 100 at FIG. 20) for utilizing the VFFS system 10 is described. In some implementations, the steps 101-106 of the method 100 are sequentially carried out in a successive order.

An elongated sheet of material S is rotatably supported at 101 on the support rod 12 and is arranged about the plurality of tensioners 14 in order to keep the elongated sheet of material S taught as the elongated sheet of material S is guided through the VFFS system 10. The plurality of tensioners 14 may be defined by at least, for example, a leading tensioner $14_1$ and a trailing tensioner $14_7$. In some instances, the plurality of tensioners 14 may also include a plurality of intermediate tensioners $14_2$-$14_6$ arranged between the leading tensioner $14_1$ and the trailing tensioner $14_7$. The elongated sheet of material S is passed from the trailing tensioner $14_7$ for subsequent guiding over the sheet guide 16 and toward the vertically arranged forming tube 18 and the product delivery cylinder 20. As shown, there are seven tensioners $14_1$-$14_7$, however, any number of tensioners $14_1$-$14_7$ may be used.

The sheet guide 16 directs the elongated sheet of material S into the vertically arranged forming tube 18 that is arranged around the product delivery cylinder 20. Once the elongated sheet of material S is directed into the vertically-arranged forming tube 18, the vertically-arranged forming tube 18 draws the left edge $E_L$ and the right edge $E_R$ of the elongated sheet of material S together in an overlapping configuration at 102 while also reconfiguring the spatial geometry of the elongated sheet of material S from a substantially planar shape (as seen, e.g., about the plurality of tensioners 14) to a substantially cylindrical or tube shape about the vertically-arranged forming tube 18. The pair of spaced-apart drive belts 22 is arranged in direct contact with the substantially cylindrical or tube-shaped elongated sheet of material S for advancing the substantially cylindrical or tube-shaped elongated sheet of material S along the vertically arranged forming tube 18 and away from a material depositing opening 28 of the product delivery cylinder 20.

As the substantially cylindrical or tube-shaped elongated sheet of material S is pulled downwardly by the pair of spaced-apart drive belts 22, the overlapping configuration of the left edge $E_L$ and the right edge $E_R$ of the elongated sheet of material S results in at least a portion of the first half of the vertically-sealable lip portion, $LV_1$, to be arranged in an overlapped orientation with respect to at least a portion of the second half of the vertically-sealable lip portion $LV_2$. Once the first half of the vertically sealable lip portion $LV_1$ is overlapped with the second half of the vertically sealable lip portion $LV_2$ the first half of the vertically sealable lip portion $LV_1$ is joined to the second half of the vertically sealable lip portion $LV_2$ by the vertical sealer 24 at 103.

Figure 1B:
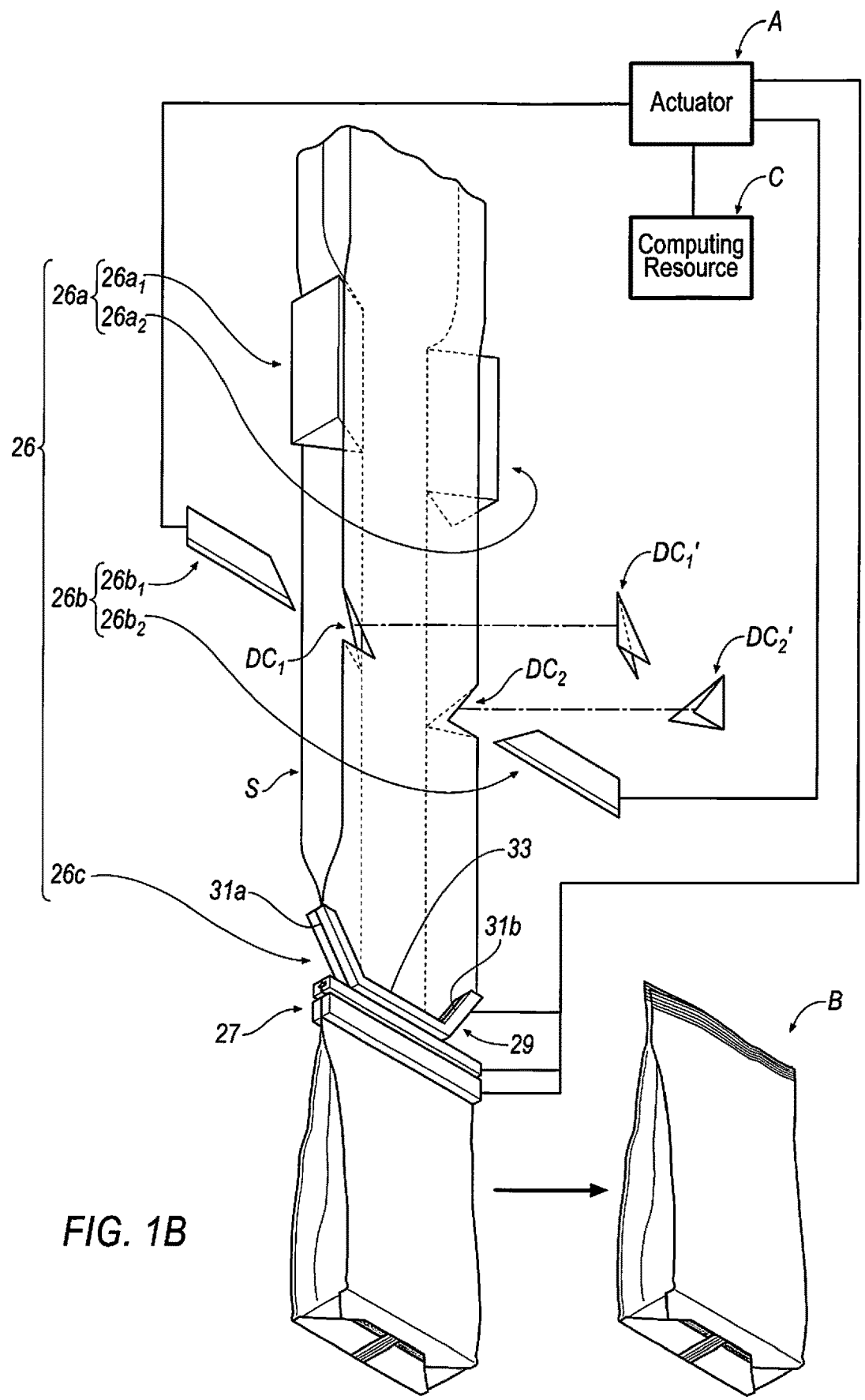
FIG. 1B is a perspective view of an exemplary finishing station of the VFFS system of FIG. 1A.
Figure 1C:
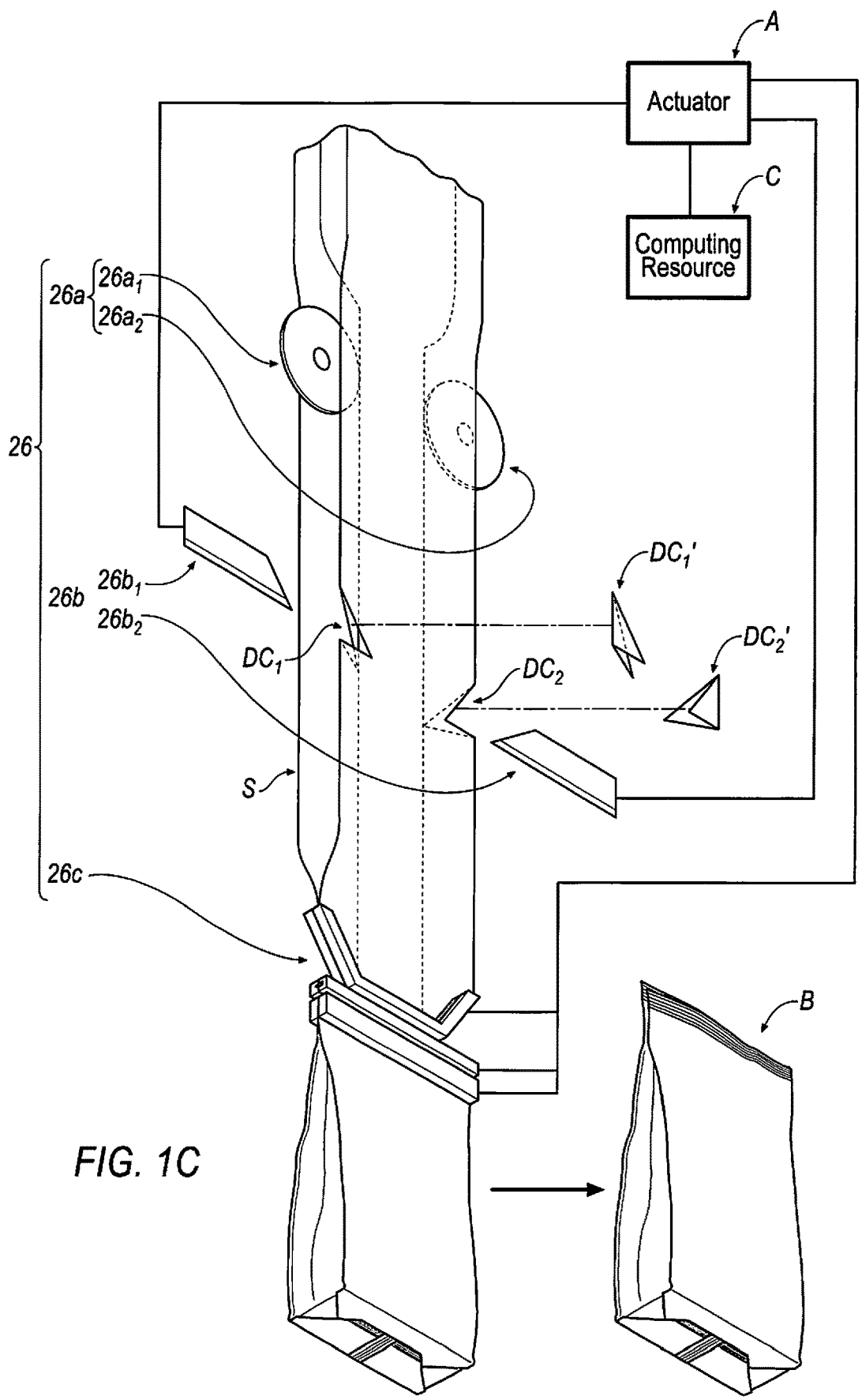
FIG. 1C a perspective view of an exemplary finishing station of the VFFS system of FIG. 1A.

After the first half of the vertically-sealable lip portion $LV_1$ is joined to the second half of the vertically-sealable lip portion $LV_2$ by the vertical sealer 24, the substantially cylindrical or tube-shaped elongated sheet of material S is advanced away from the vertical sealer 24 by the pair of spaced-apart drive belts 22 and toward the finishing station 26. Referring to FIGS. 1B and 1C, the finishing station 26 may include one or more mechanisms 26a, 26b, and 26c for further spatially and physically manipulating the substantially cylindrical or tube-shaped elongated sheet of material S that will ultimately provide the substantially flat, rectangular-shaped footprint of the flat-bottom stand-up bag B. Some or all of the one or more mechanisms may be connected to one or more actuators A. The one or more actuators A may cause the one or more mechanisms 26a, 26b, 26c to be spatially manipulated relative to the sheet of material S in order to form the flat-bottom stand-up bag B. The one or more actuators A may be connected to a computing resource C. The computing resource C may send one or more periodic actuating signals to the one or more actuators A for causing movement of or actuating the one or more actuators A.

Referring to FIGS. 1B and 4A-4C, in some implementations, the finishing station 26 includes a gusseting mechanism 26a defined by a first stationary gusseting rail $26a_1$ and a second stationary gusseting rail $26a_2$. The first stationary gusseting rail $26a_1$ is spaced apart from the second stationary gusseting rail $26a_2$ by a distance D thereby forming a gap G therebetween.

With reference to FIGS. 1B, 4A, and 4B, the drive belts 22 (shown in FIG. 1A) advance the substantially cylindrical or tube-shaped elongated sheet of material S through the finishing station 26 such that the substantially cylindrical or tube-shaped elongated sheet of material S is drawn through the gap G between the first stationary gusseting rail $26a_1$ and the second stationary gusseting rail $26a_2$. With reference to FIGS. 4B-4C, a spacing between the left sidewall panel portion $SP_L$ and the right sidewall panel portion SPR of the substantially cylindrical or tube-shaped elongated sheet of material S is defined by a geometry that is greater than the distance D between the first stationary gusseting rail $26a_1$ and a second stationary gusseting rail $26a_2$. Accordingly, the pair of stationary gusseting rails $26a_1$, $26a_2$ cooperate to shape each of the left sidewall panel portion $SP_L$ of the substantially cylindrical or tube-shaped elongated sheet of material S and the right sidewall panel portion $SP_R$ of the substantially cylindrical or tube-shaped elongated sheet of material S to include a gusseted tuck T at 104 as the drive belts 22 advance the substantially cylindrical or tube-shaped elongated sheet of material S through the finishing station 26.

Referring to FIG. 1C, in some instances, the gusseting mechanism 26a may alternatively include a first gusseting disk $26a_1$ and a second gusseting disk $26a_2$ that are spaced apart by a distance D, thereby forming a gap G therebetween. In some examples, the gusseting disks $26a_1$, $26a_2$ may be spatially fixed in place. In other examples, each gusseting disk $26a_1$, $26a_2$ may be permitted to rotate about an axis A-A (FIG. 9C) extending through an axial center of each gusseting disk $26a_1$, $26a_2$. The gusseting disks $26a_1$, $26a_2$ may function in a substantially similar manner as described above with respect to the first stationary gusseting rail $26a_1$ and the second stationary gusseting rail $26a_2$. If the gusseting disks $26a_1$, $26a_2$ are permitted to rotate about respective axes A-A, the gusseting disks $26a_1$, $26a_2$ may passively rotate about the respective axes A-A as the spaced-apart drive belts 22 advance the substantially cylindrical or tube-shaped elongated sheet of material S through the finishing station 26.

Referring to FIGS. 5A and 5B, in some implementations, the finishing station 26 further includes a cutting mechanism 26b. As seen in FIGS. 1B and 1C, the cutting mechanism 26b may include one or a pair of cutters $26b_1$, $26b_2$. The cutter or pair of cutters $26b_1$, $26b_2$ may include, but is/are not limited to knives, scissors, punchers, die-cutters, shears, lasers, or the like. After the substantially cylindrical or tube-shaped elongated sheet of material S has been shaped to form the gusset tucks T as described above, the pair of spaced-apart drive belts 22 advances the gusseted, substantially cylindrical or tube-shaped elongated sheet of material S through the finishing station 26 such that the gusseted, substantially cylindrical or tube-shaped elongated sheet of material S interfaces with the cutting mechanism 26b. The cutting mechanism 26b removes the first portion $DC_1'$ and the second portion $DC_2'$ of the gusseted, substantially cylindrical or tube-shaped elongated sheet of material S in order to provide the gusseted, substantially cylindrical or tube-shaped elongated sheet of material S with a first cut $DC_1$ and a second cut $DC_2$ at 105.

Figure 6:
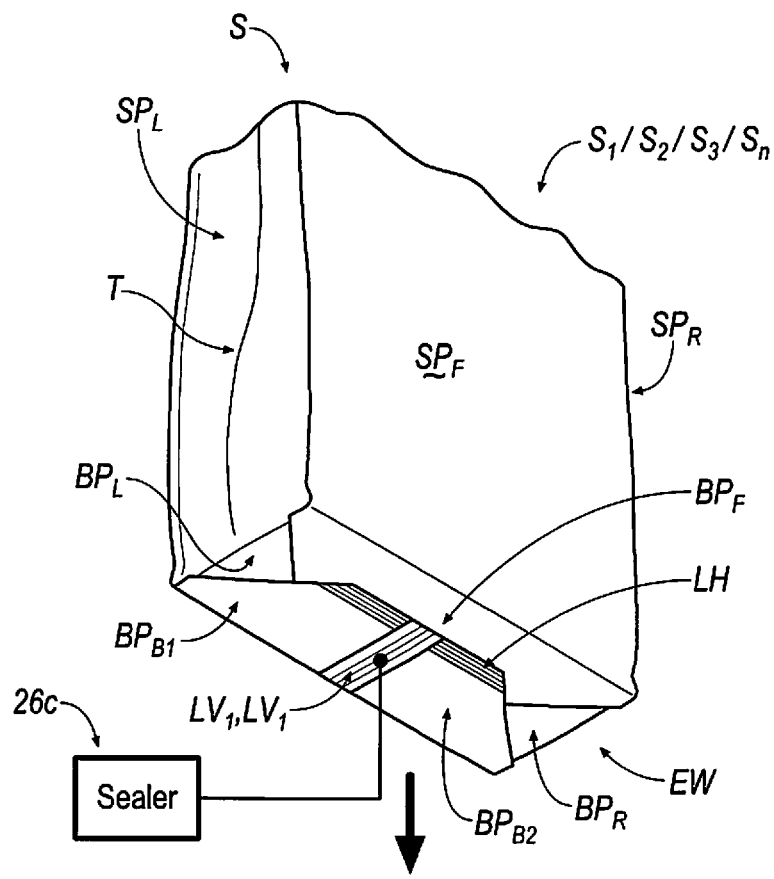
FIG. 6 is a perspective view of a portion of a finishing station of the VFFS system of FIG. 1A and the portion of the segment of the elongated sheet of material of FIG. 5B.

Referring to FIG. 6, the finishing station 26 further includes a sealing mechanism 26c. As seen in FIGS. 1B and 1C, the sealing mechanism 26c may include a "K-shaped" sealing mechanism. The "K-shaped" sealing mechanism 26c provides the bag B with a sealed edge 29 at the end wall (EW) that has a substantially "U" shape. In one configuration, the "U" shape includes two pairs of legs 31a and 31b extending from a single cross member (i.e., sealed lip portion (LH)) 33 that joins the legs 31a and 31b. The legs extend from the cross member on both sides of the bag B such that a pair of legs are associated with the front bottom panel portion $BP_F$ and a pair of legs are associated with the back bottom panel portion $BP_{B1}$ and the back bottom panel portion $BP_{B2}$. Specifically, a first leg is formed at a sealed junction of the front bottom panel portion $BP_F$ and the left bottom panel portion $BP_L$ and a second leg is formed at a sealed junction of the front bottom panel portion $BP_F$ and the right bottom panel portion $BP_R$. Similarly, a third leg is formed at a sealed junction of the back bottom panel portion $BP_{B1}$ and the left bottom panel portion $BP_L$ and a fourth leg is formed at a sealed junction of the back bottom panel portion $BP_{B2}$ and the right bottom panel portion $BP_R$.

Each of the legs terminate and are attached to the cross member (i.e., the sealed lip portion (LH)). Accordingly, when viewing the bag B from the front sidewall panel portion $SP_F$, the first leg, the second leg, and the cross member cooperate to provide a sealed edge having a substantially "U" shape. Similarly, when the bag B is viewed from the back sidewall panel portions $SP_{B1}$, $SP_{B2}$, the third leg, the fourth leg, and the cross member cooperate to provide a sealed edge having a substantially "U" shape. In this configuration, the legs extend from the cross member at an obtuse angle and in a direction away from one another. The shape of the sealed edge is generally dictated by the "K" shape of the sealing mechanism 26c, as shown in FIG. 9B.

Once the bag B is fully formed, the cross member is folded toward the front bottom panel portion $BP_F$ and is held in place by crimping the first leg and the second leg, as shown in FIG. 6. The crimp formed in the first leg and the second leg may be formed by folding the first leg and the second leg such that the cross member is brought into close proximity to the front bottom panel portion $BP_F$. Once the cross member is in the desired position relative to the front bottom panel portion $BP_F$, the first leg and the second leg may be locally deformed at the area of the fold via heat and/or pressure to maintain the folded nature of the first leg and the second leg. Folding the first leg and the second leg in this fashion provides the bag B with a substantially flat end wall (EW). While the first leg and the second leg are described as being folded, the third leg and the fourth leg could alternatively be folded such that the cross member is brought toward the back bottom panel portion $BP_{B1}$ and the back bottom panel portion $BP_{B2}$.

After the gusseted, substantially cylindrical or tube-shaped elongated sheet of material S has been shaped to include the first cut $DC_1$ and the second cut $DC_2$, as described above, the pair of spaced-apart drive belts 22 advances the cut, gusseted, substantially cylindrical or tube-shaped elongated sheet of material S through the finishing station 26 such that the cut, gusseted, substantially cylindrical or tube-shaped elongated sheet of material S interfaces with the sealing mechanism 26c. As seen in FIG. 6, the sealing mechanism 26c may spatially manipulate and seal the cut and gusseted, substantially cylindrical or tube-shaped elongated sheet of material S at 106 by: (1) folding the bottom edge $E_B$ (see, e.g., FIG. 5B) of the cut and gusseted, substantially cylindrical or tube-shaped elongated sheet of material S such that the front horizontally-sealable lip portion $LH_F$ overlaps with both of the first half of the back horizontally-sealable lip portion $LH_{B1}$ and the second half of the back horizontally-sealable lip portion $LH_{B2}$; and then (2) sealing the front horizontally-sealable lip portion $LH_F$ to both of the first half of the back horizontally-sealable lip portion $LH_{B1}$ and the second half of the back horizontally-sealable lip portion $LH_{B2}$ to thereby seal the plurality of horizontally-sealable lip portions LH and form the enclosed end wall EW.

Figure 7:
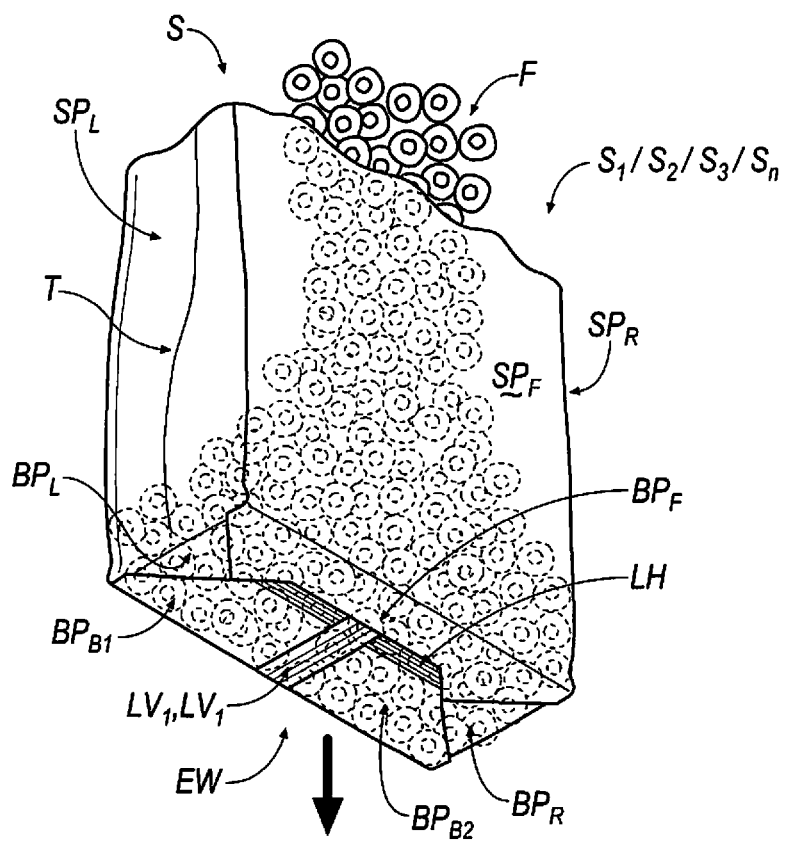
FIG. 7 is a perspective view of a portion of the VFFS system of FIG. 1A and the portion of the segment of the elongated sheet of material of FIG. 6.
Figure 8A:
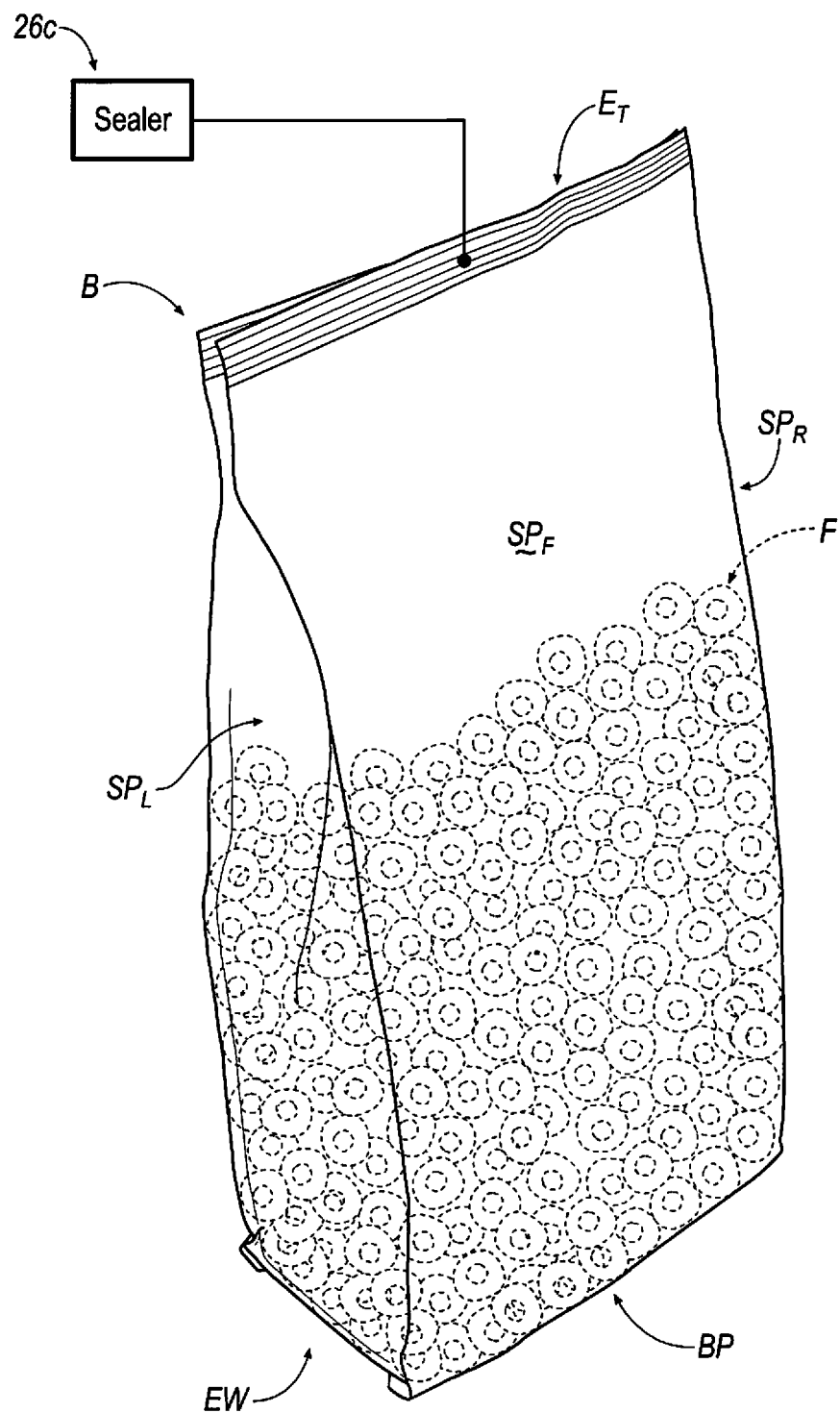
FIG. 8A is a perspective view of a portion of the finishing station of the VFFS system of FIG. 6 and the portion of the segment of the elongated sheet of material of FIG. 7.
Figure 8B:
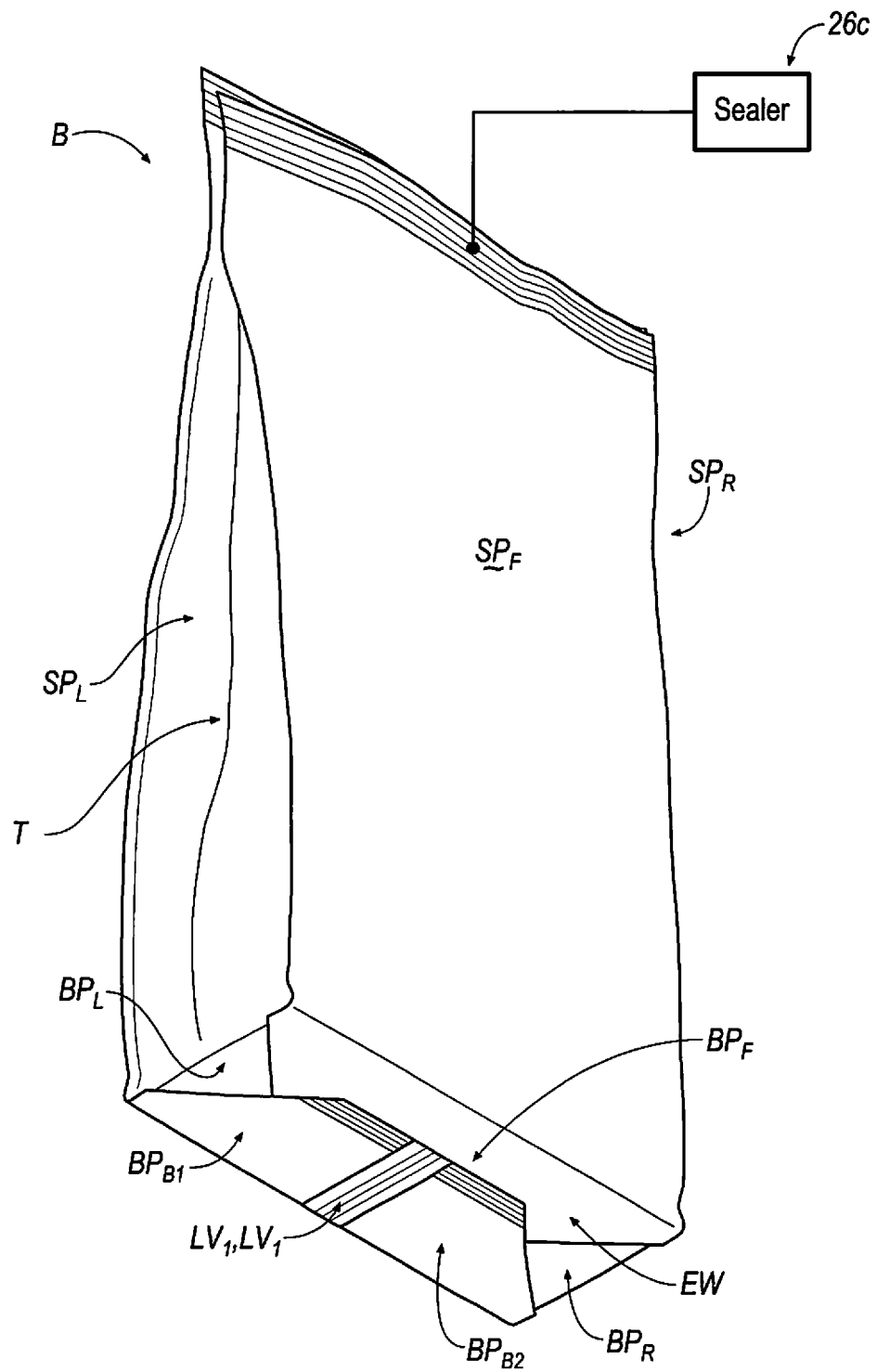
FIG. 8B is another perspective view of the portion of the finishing station of the VFFS system of FIG. 8A and the portion of the segment of the elongated sheet of material of FIG. 8A.
Figure 8C:
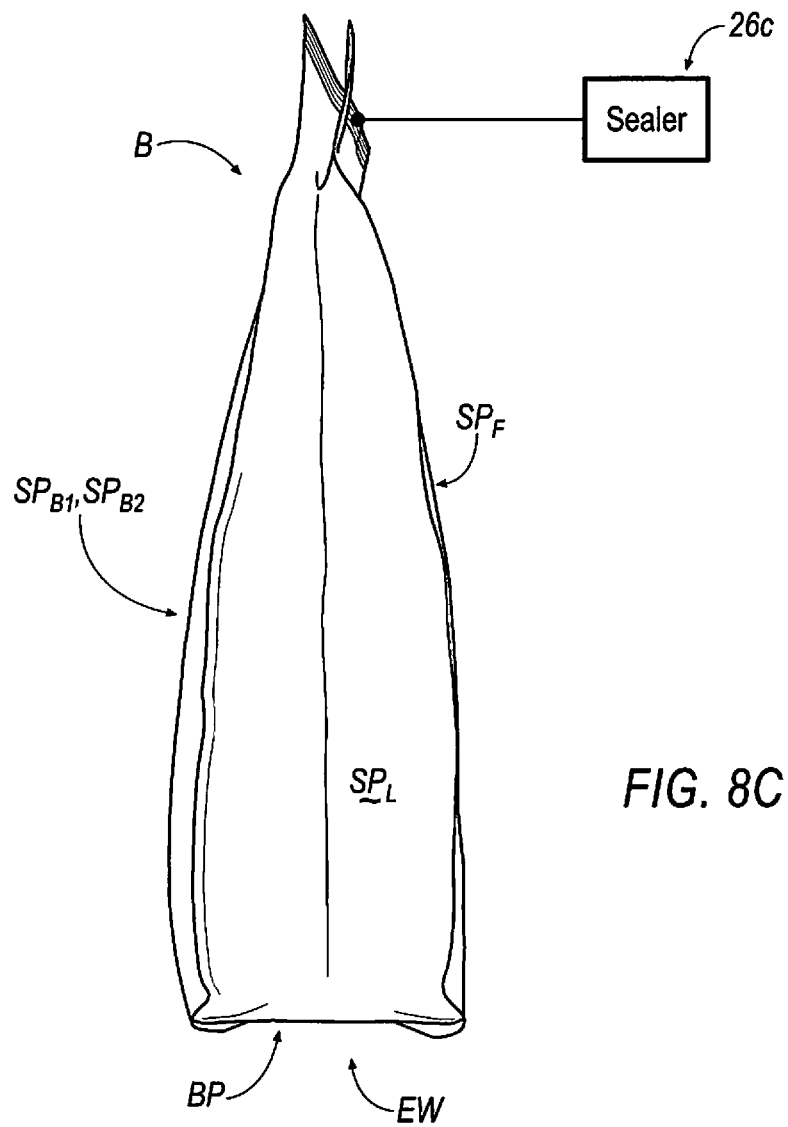
FIG. 8C is another perspective view of the portion of the finishing station of the VFFS system of FIG. 8A and the portion of the segment of the elongated sheet of material of FIG. 8A.
Figure 8D:
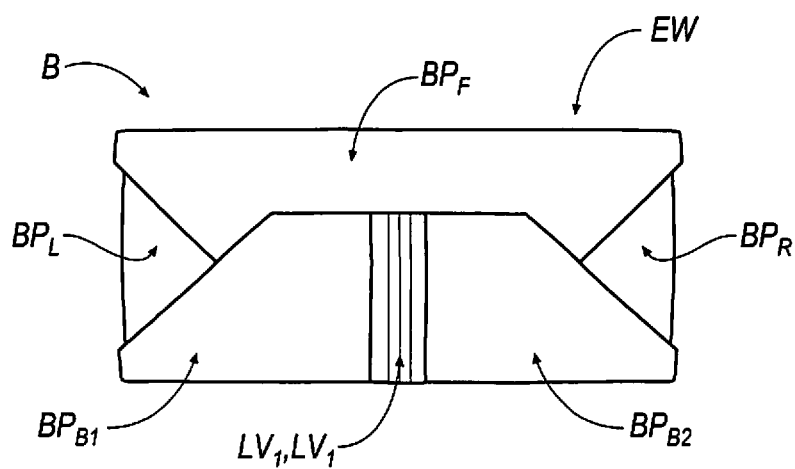
FIG. 8D is a bottom view of the portion of the segment of the elongated sheet of material of FIG. 8A.

Referring to FIG. 7, once the sealing mechanism 26c of the finishing station 26 folds and seals the cut and gusseted, substantially cylindrical or tube-shaped elongated sheet of material S to form the enclosed end wall EW as described above, the VFFS system 10 is then subsequently actuated for passing foodstuff F (e.g., cereal, chips, popcorn, candy, nuts or the like) through the material depositing opening 28 of the product delivery cylinder 20 and then through the vertically-arranged forming tube 18 for subsequent arrival in a cavity formed by the sealed, folded, cut and gusseted, substantially cylindrical or tube-shaped elongated sheet of material S. The enclosed end wall EW prevents the foodstuff F from escaping out of the cavity of the sealed, folded, cut, gusseted, substantially cylindrical, or tube-shaped elongated sheet of material S while the sealed, folded, cut and gusseted, substantially cylindrical or tube-shaped elongated sheet of material S is still interfaced with the VFFS system 10.

Referring to FIGS. 1A and 8A-8D, the pair of spaced-apart drive belts 22 may then advance the sealed, folded, cut and gusseted, substantially cylindrical or tube-shaped elongated sheet of material S (including the foodstuff F deposited therein) through the finishing station 26 such that the enclosed end wall EW of the sealed, folded, cut and gusseted, substantially cylindrical or tube-shaped elongated sheet of material S (including the foodstuff F deposited therein) is moved past the sealing mechanism 26c. Movement of the sealed, folded, cut and gusseted, substantially cylindrical or tube-shaped elongated sheet of material S (including the foodstuff F deposited therein), may cease once the top edge $E_T$ (as seen in, e.g., FIG. 8A) of the sealed, folded, cut and gusseted, substantially cylindrical or tube-shaped elongated sheet of material S (including the foodstuff F deposited therein) is arranged proximate the sealing mechanism 26c. Then, the sealing mechanism 26c may be actuated again for simultaneously sealing the top edge $E_T$ of the sealed, folded, cut and gusseted, substantially cylindrical or tube-shaped elongated sheet of material S (including the foodstuff F deposited therein) while also simultaneously forming an enclosed end wall EW of the next segment of the plurality of segments $S_P$ reeled from the elongated sheet of material S. When the top edge $E_T$ of the sealed, folded, cut and gusseted, substantially cylindrical or tube-shaped elongated sheet of material S (including the foodstuff F deposited therein), is sealed as described above, a cutter 27 may sever the sealed, folded, cut and gusseted, substantially cylindrical or tube-shaped elongated sheet of material S (including the foodstuff F deposited therein), along the top edge $E_T$ to thereby provide the flat bottom stand-up bag B with the foodstuff F provided therein. The cutter may be incorporated into the sealer 26c such that the sealer 26c substantially simultaneously seals the top edge $E_T$ of the bag B and severs the bag B from the adjacent bag being formed from the sheet of material S by the VFFS system 10.

Figure 9A:
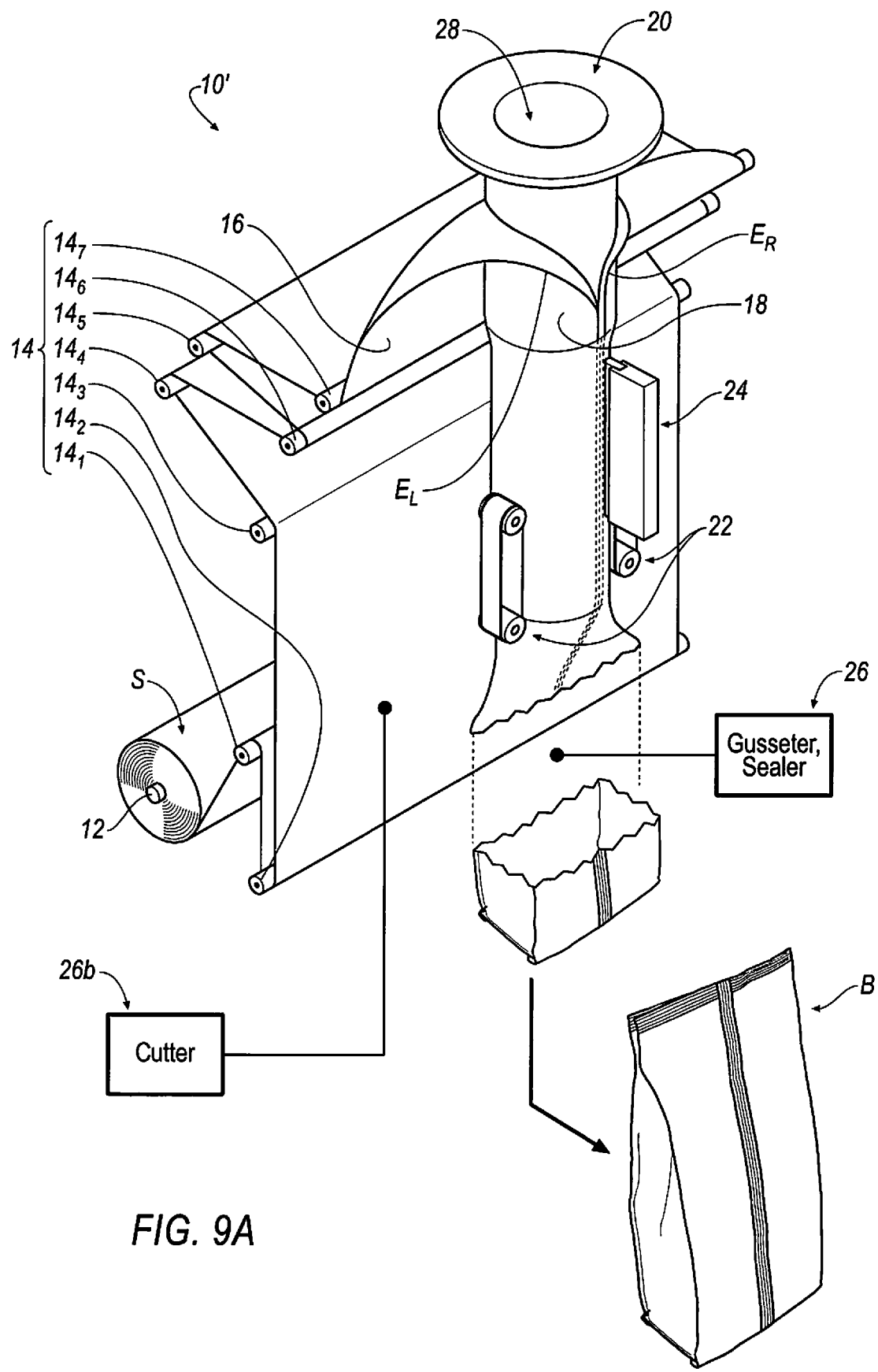
FIG. 9A is a perspective view of an exemplary VFFS system.
Figure 9B:
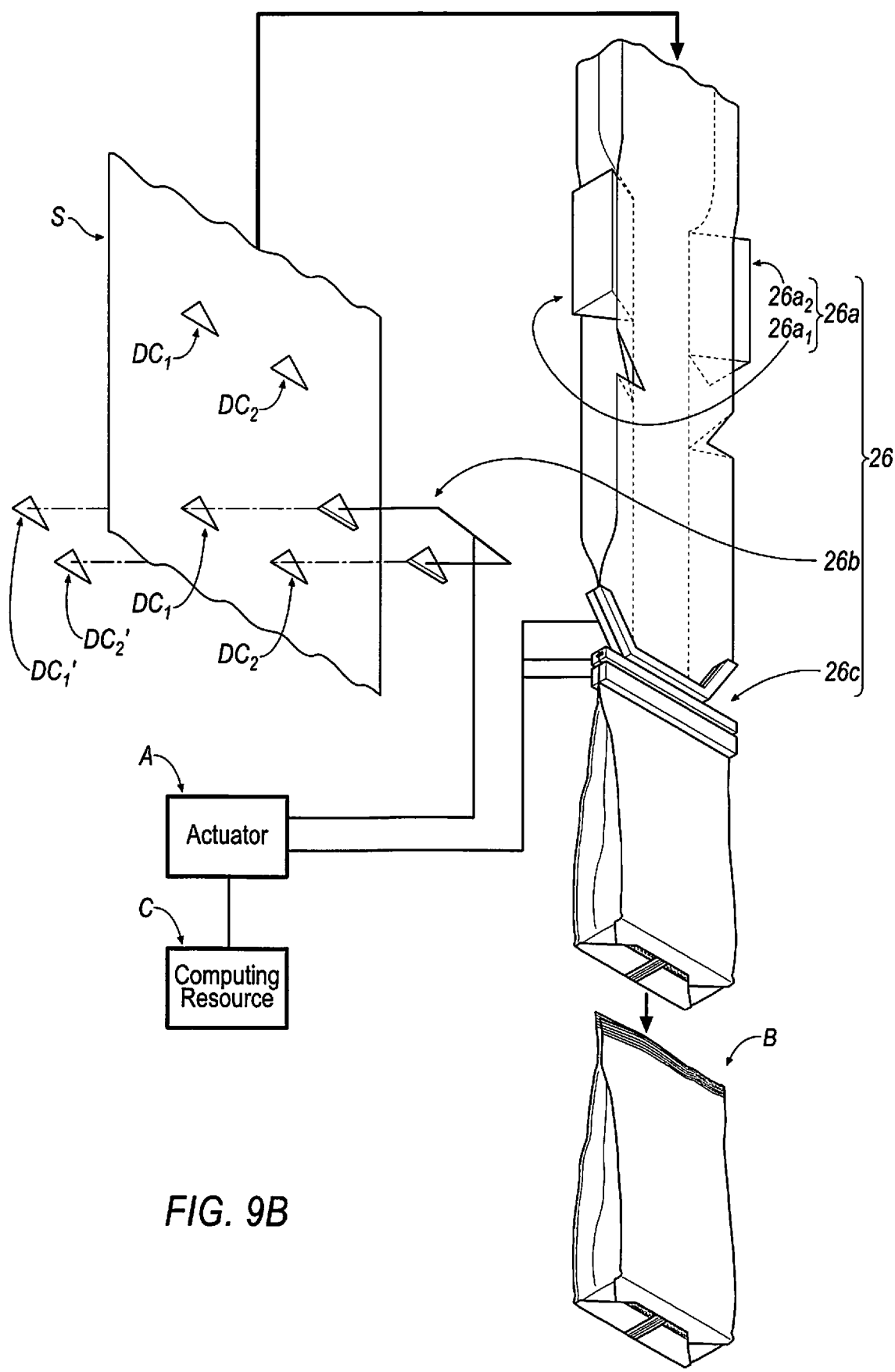
FIG. 9B is a perspective view of an exemplary finishing station of the VFFS system of FIG. 9A.
Figure 21:
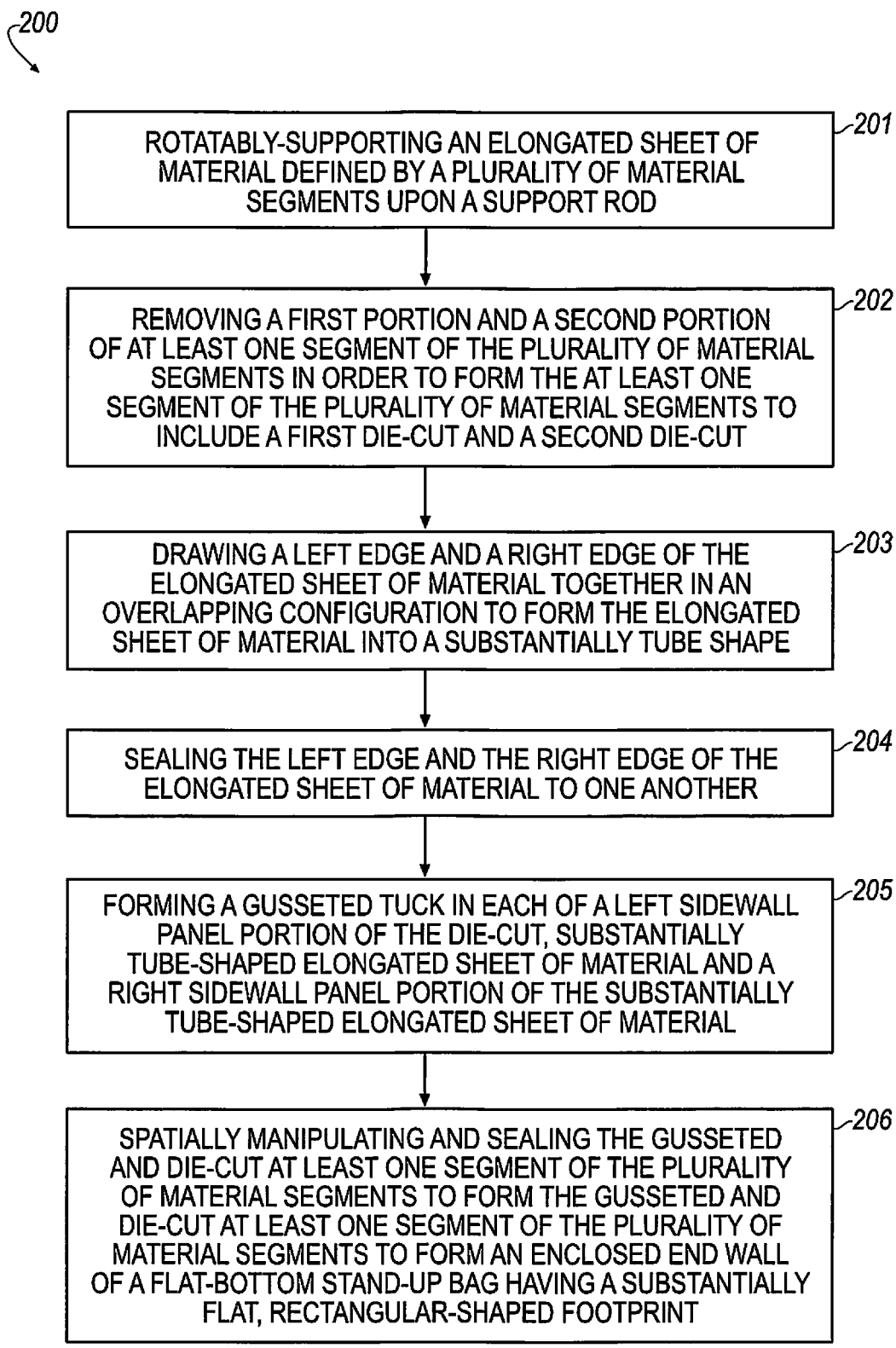
FIG. 21 is a flow diagram of another exemplary method for forming a flat-bottom stand-up bag from the elongated sheet of material including the plurality of segments of FIG. 2.

Referring to FIG. 9A, an exemplary method (see also, e.g., 200 at FIG. 21) for utilizing a VFFS system 10' is described. In some implementations, the steps 201-206 of the method are sequentially carried out in successive order.

An elongated sheet of material S is rotatably supported on the support rod 12 at 201 and is arranged about the plurality of tensioners 14 in order to keep the elongated sheet of material S taught as the elongated sheet of material S is guided through the VFFS system 10'. The plurality of tensioners 14 may be defined by at least, for example, a leading tensioner $14_1$ and a trailing tensioner $14_7$. In some instances, the plurality of tensioners 14 may also include a plurality of intermediate tensioners $14_2$-$14_6$ arranged between the leading tensioner $14_1$ and the trailing tensioner $14_7$. The elongated sheet of material S is passed from the trailing tensioner $14_7$ for subsequent guiding over the sheet guide 16 and toward the vertically arranged forming tube 18 and the product delivery cylinder 20.

The sheet guide 16 directs the elongated sheet of material S into the vertically arranged forming tube 18 that is arranged around the product delivery cylinder 20. Once the elongated sheet of material S is directed into the vertically-arranged forming tube 18, the vertically-arranged forming tube 18 draws the left edge $E_L$ and the right edge $E_R$ of the elongated sheet of material S together in an overlapping configuration while also reconfiguring the spatial geometry of the elongated sheet of material S from a substantially planar shape (as seen, e.g., about the plurality of tensioners 14) to a substantially cylindrical or tube shape about the vertically-arranged forming tube 18 at 203. The pair of spaced-apart drive belts 22 is arranged in direct contact with the substantially cylindrical or tube-shaped elongated sheet of material S for advancing the substantially cylindrical or tube-shaped elongated sheet of material S along the vertically arranged forming tube 18 and away from a material depositing opening 28 of the product delivery cylinder 20.

As the substantially cylindrical or tube-shaped elongated sheet of material S is pulled downwardly by the pair of spaced-apart drive belts 22, the overlapping configuration of the left edge $E_L$ and the right edge $E_R$ of the elongated sheet of material S results in at least a portion of the first half of the vertically-sealable lip portion $LV_1$ being arranged in an overlapped orientation with respect to at least a portion of the second half of the vertically-sealable lip portion $LV_2$. Once the first half of the vertically sealable lip portion $LV_1$ is overlapped with the second half of the vertically sealable lip portion $LV_2$, the first half of the vertically sealable lip portion $LV_1$ is joined to the second half of the vertically sealable lip portion $LV_2$ by the vertical sealer 24 at 204.

After the first half of the vertically-sealable lip portion $LV_1$ is joined to the second half of the vertically-sealable lip portion $LV_2$ by the vertical sealer 24, the substantially cylindrical or tube-shaped elongated sheet of material S is advanced away from the vertical sealer 24 by the pair of spaced-apart drive belts 22 and toward the finishing station 26. Referring to FIGS. 9B-9C and 9D-9E, the finishing station 26 may include one or more mechanisms 26a, 26b, and 26c for further spatially and physically manipulating the substantially cylindrical or tube-shaped elongated sheet of material S that will ultimately provide the substantially flat, rectangular-shaped footprint of the flat-bottom stand-up bag B. Some or all of the one or more mechanisms may be connected to one or more actuators A. The one or more actuators A may cause the one or more mechanisms 26a, 26b, 26c to be spatially manipulated relative to the sheet of material S in order to form the flat-bottom stand-up bag B. The one or more actuators A may be connected to a computing resource C. The computing resource C may send one or more periodic actuating signals to the one or more actuators A for causing movement of or actuating the one or more actuators A.

Figure 9C:
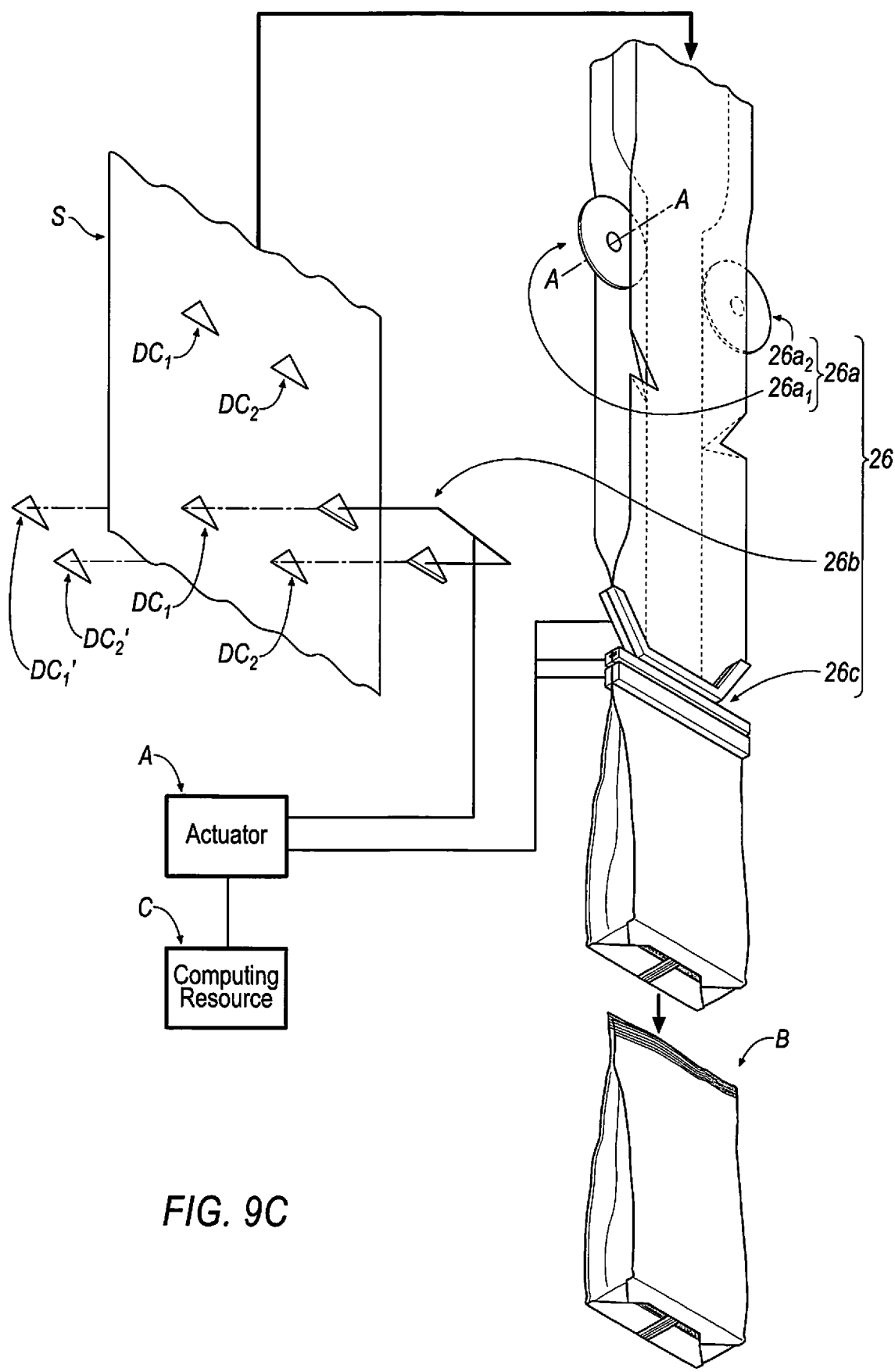
FIG. 9C is a perspective view of an exemplary finishing station of the VFFS system of FIG. 9A.

Unlike the VFFS system 10 described above at FIG. 1A, the VFSS system 10' is subtly different in that the finishing station 26 does not include the cutting mechanism 26b arranged proximate to the gusseting mechanism 26a and the sealing mechanism 26c. Rather, the cutting mechanism 26b (as seen, e.g., at FIG. 9B or 9C) of the VFFS system 10' provides the first cut $DC_1$ and the second cut $DC_2$ in the elongated sheet of material S at 202 after the elongated sheet of material S is reeled off of the support rod 12 and before the elongated sheet of material S is guided over the sheet guide 16 and toward the vertically-arranged forming tube 18 and the product delivery cylinder 20 for shaping the elongated sheet of material S into a tube shape. As a result, the elongated sheet of material S is formed to include the first cut $DC_1$ and the second cut $DC_2$ by the cutting mechanism 26b when the elongated sheet of material S in the form of a substantially planar sheet (as seen, for example, when the elongated sheet of material S is located about the plurality of tensioners 14) and not when the elongated sheet of material S has been formed into a substantially tube shape and gusseted as described above with respect to the VFFS system 10 of FIG. 1A. As seen in FIGS. 9B and 9C, the cutting mechanism 26b may include one or a pair of punchers or die-cutters. Alternatively, the cutting mechanism 26b may include, but is/are not limited to knives, scissors, shears, lasers, or the like.

Referring to FIGS. 10A-10C, in some implementations, the finishing station 26 includes a gusseting mechanism 26a defined by a first stationary gusseting rail $26a_1$ and a second stationary gusseting rail $26a_2$ defining a pair of stationary gusseting rails 26a. The first stationary gusseting rail $26a_1$ is spaced apart from the second stationary gusseting rail $26a_2$ by a distance D thereby forming a gap G therebetween.

With reference to FIGS. 9B, 10A, and 10B, the pair of spaced-apart drive belts 22 advances the cut, substantially cylindrical or tube-shaped elongated sheet of material S through the finishing station 26 such that the cut, substantially cylindrical or tube-shaped elongated sheet of material S is drawn through the gap G between the first stationary gusseting rail $26a_1$ and the second stationary gusseting rail $26a_2$. With reference to FIGS. 10B-10C, because a spacing between the left sidewall panel portion $SP_L$ and the right sidewall panel portion $SP_R$ of the cut, substantially cylindrical or tube-shaped elongated sheet of material S is defined by a geometry that is greater than the distance D between the first stationary gusseting rail $26a_1$ and a second stationary gusseting rail $26a_2$, the pair of stationary gusseting rails $26a_1$, $26a_2$ shapes each of the left sidewall panel portion $SP_L$ of the cut, substantially cylindrical or tube-shaped elongated sheet of material S and the right sidewall panel portion $SP_R$ of the cut, substantially cylindrical or tube-shaped elongated sheet of material S to include a gusseted tuck T at 205 as the pair of spaced-apart drive belts 22 advances the substantially cylindrical or tube-shaped elongated sheet of material S through the finishing station 26.

Referring to FIG. 9C, in some instances, the gusseting mechanism 26a may alternatively include a first gusseting disk $26a_1$ and a second gusseting disk $26a_2$ that are spaced apart by a distance D thereby forming a gap G therebetween. In some examples, the gusseting disks $26a_1$, $26a_2$ may be spatially fixed in place. In other examples, each gusseting disk $26a_1$, $26a_2$ may be permitted to rotate about an axis A-A extending through an axial center of each gusseting disk $26a_1$, $26a_2$. The gusseting disks $26a_1$, $26a_2$ may function in a substantially similar manner as described above at FIGS. 10A-10C with respect to the first stationary gusseting rail $26a_1$ and a second stationary gusseting rail $26a_2$. If the gusseting disks $26a_1$, $26a_2$ are permitted to rotate about the axis A-A, the gusseting disks $26a_1$, $26a_2$ may passively rotate about the axis A-A as the spaced-apart drive belts 22 advance the substantially cylindrical or tube-shaped elongated sheet of material S through the finishing station 26.

Figure 11:
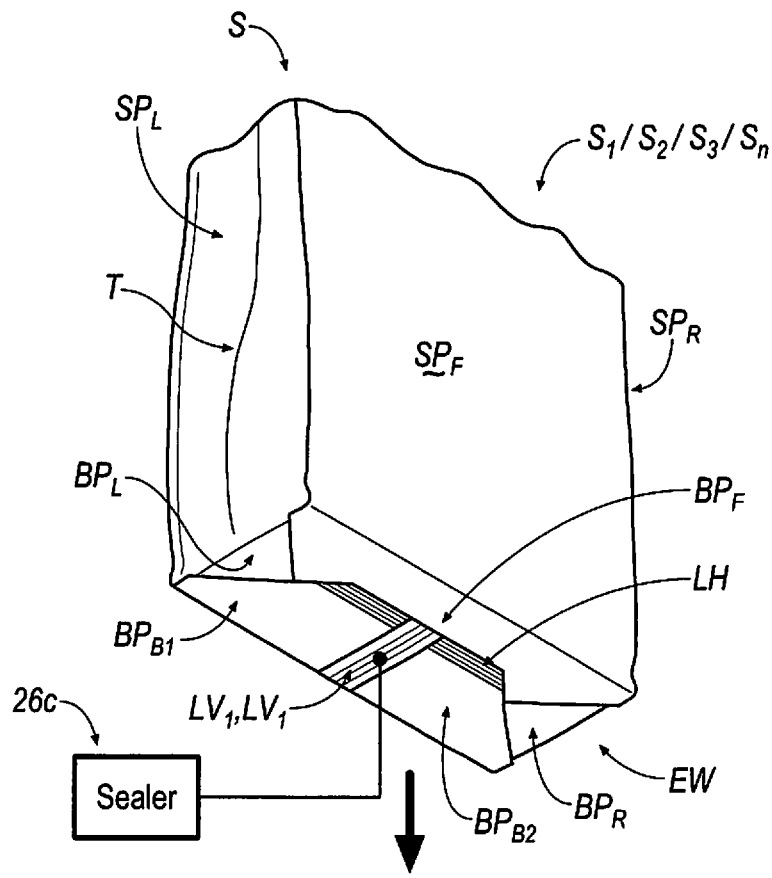
FIG. 11 is a perspective view of a portion of a finishing station of the VFFS system of FIG. 9A and the portion of the segment of the elongated sheet of material of FIG. 10C.

Referring to FIG. 11, the finishing station 26 further includes a sealing mechanism 26c. As seen in FIGS. 9B and 9C, the sealing mechanism 26c may include a "K-shaped" sealing mechanism.

After the gusseted and cut substantially cylindrical or tube-shaped elongated sheet of material S has been shaped as described above, the drive belts 22 advance the gusseted and cut substantially cylindrical or tube-shaped elongated sheet of material S through the finishing station 26 such that the gusseted and cut substantially cylindrical or tube-shaped elongated sheet of material S is interfaced with the sealing mechanism 26c. The sealing mechanism 26c may spatially manipulate and seal the gusseted and cut substantially cylindrical or tube-shaped elongated sheet of material S at 206 in a manner by: (1) folding the bottom edge $E_B$ of the gusseted and cut substantially cylindrical or tube-shaped elongated sheet of material S such that the front horizontally-sealable lip portion $LH_F$ overlaps with both of the first half of the back horizontally-sealable lip portion $LH_{B1}$ and the second half of the back horizontally-sealable lip portion $LH_{B2}$ and then (2) sealing the front horizontally-sealable lip portion $LH_F$ to both of the first half of the back horizontally-sealable lip portion $LH_{B1}$ and the second half of the back horizontally-sealable lip portion $LH_{B2}$ to thereby seal the plurality of horizontally-sealable lip portions LH and form the enclosed end wall EW.

Figure 12:
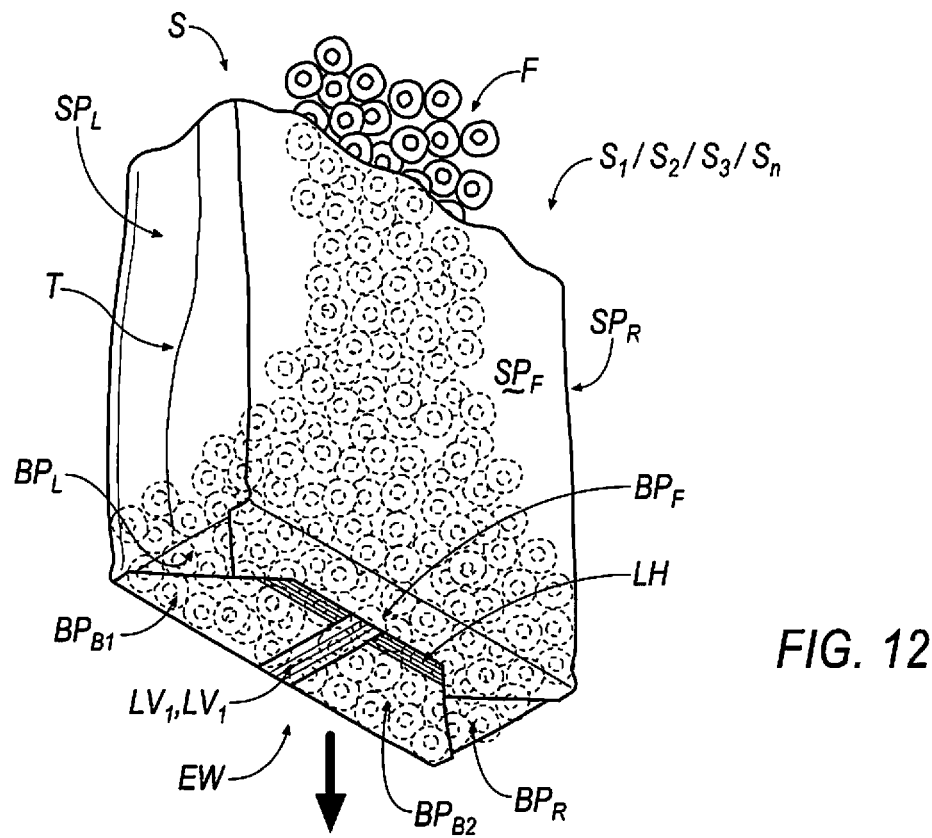
FIG. 12 is a perspective view of a portion of the VFFS system of FIG. 9A and the portion of the segment of the elongated sheet of material of FIG. 11.

Referring to FIG. 12, once the sealing mechanism 26c of the finishing station 26 folds and seals the gusseted and cut substantially cylindrical or tube-shaped elongated sheet of material S to form the enclosed end wall EW as described above, the VFFS system 10' is then subsequently actuated for passing foodstuff F (e.g., cereal, chips, popcorn, candy, nuts or the like) through the material depositing opening 28 of the product delivery cylinder 20 and then through the vertically-arranged forming tube 18 for subsequent arrival in a cavity formed by the sealed, folded, gusseted and cut substantially cylindrical or tube-shaped elongated sheet of material S. The enclosed end wall EW prevents the foodstuff F from escaping out of the cavity of the sealed, folded, gusseted and cut substantially cylindrical or tube-shaped elongated sheet of material S while the sealed, folded, gusseted and cut substantially cylindrical or tube-shaped elongated sheet of material S is still interfaced with the VFFS system 10'.

Figure 13A:
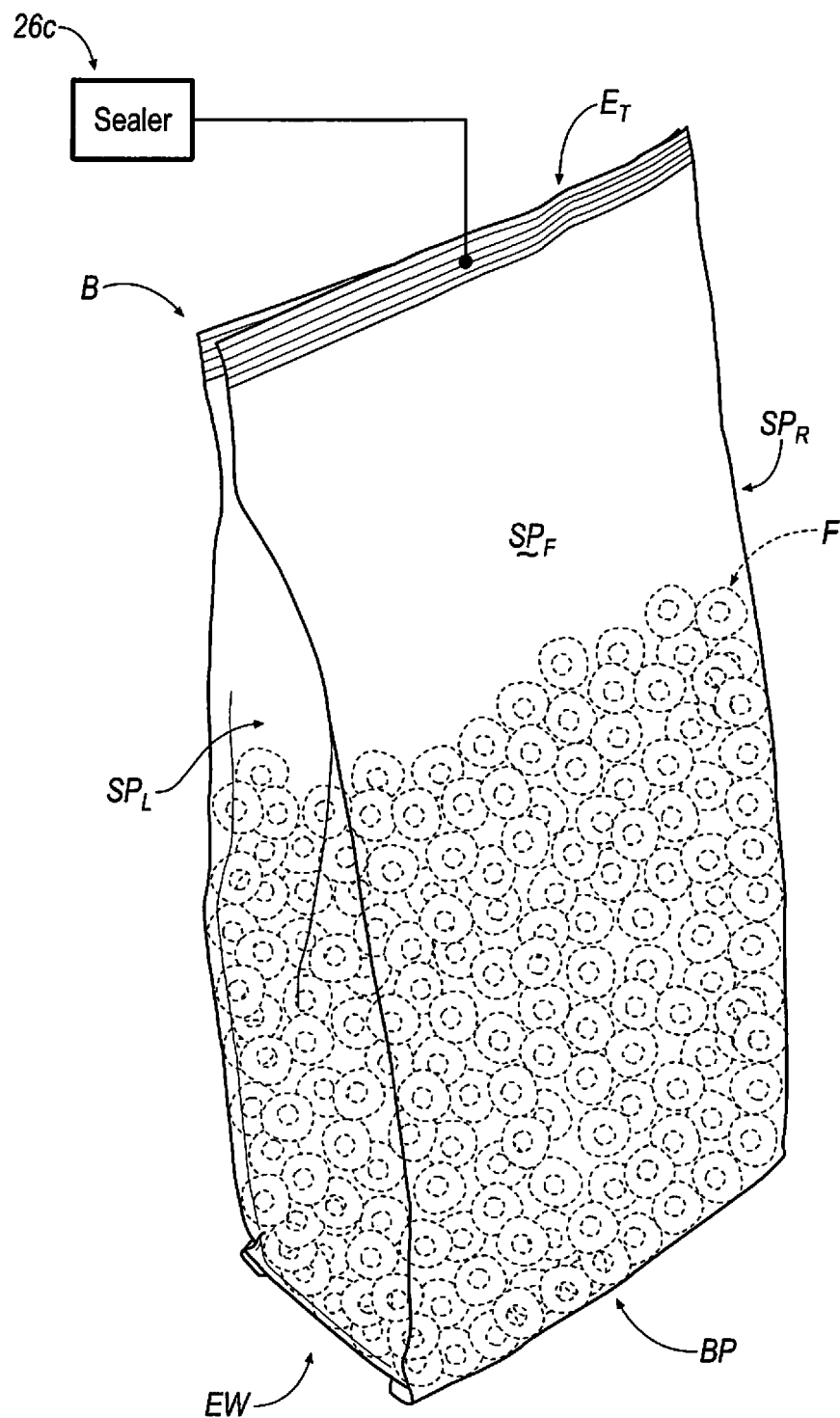
FIG. 13A is a perspective view of a portion of the finishing station of the VFFS system of FIG. 11 and the portion of the segment of the elongated sheet of material of FIG. 12.
Figure 13B:
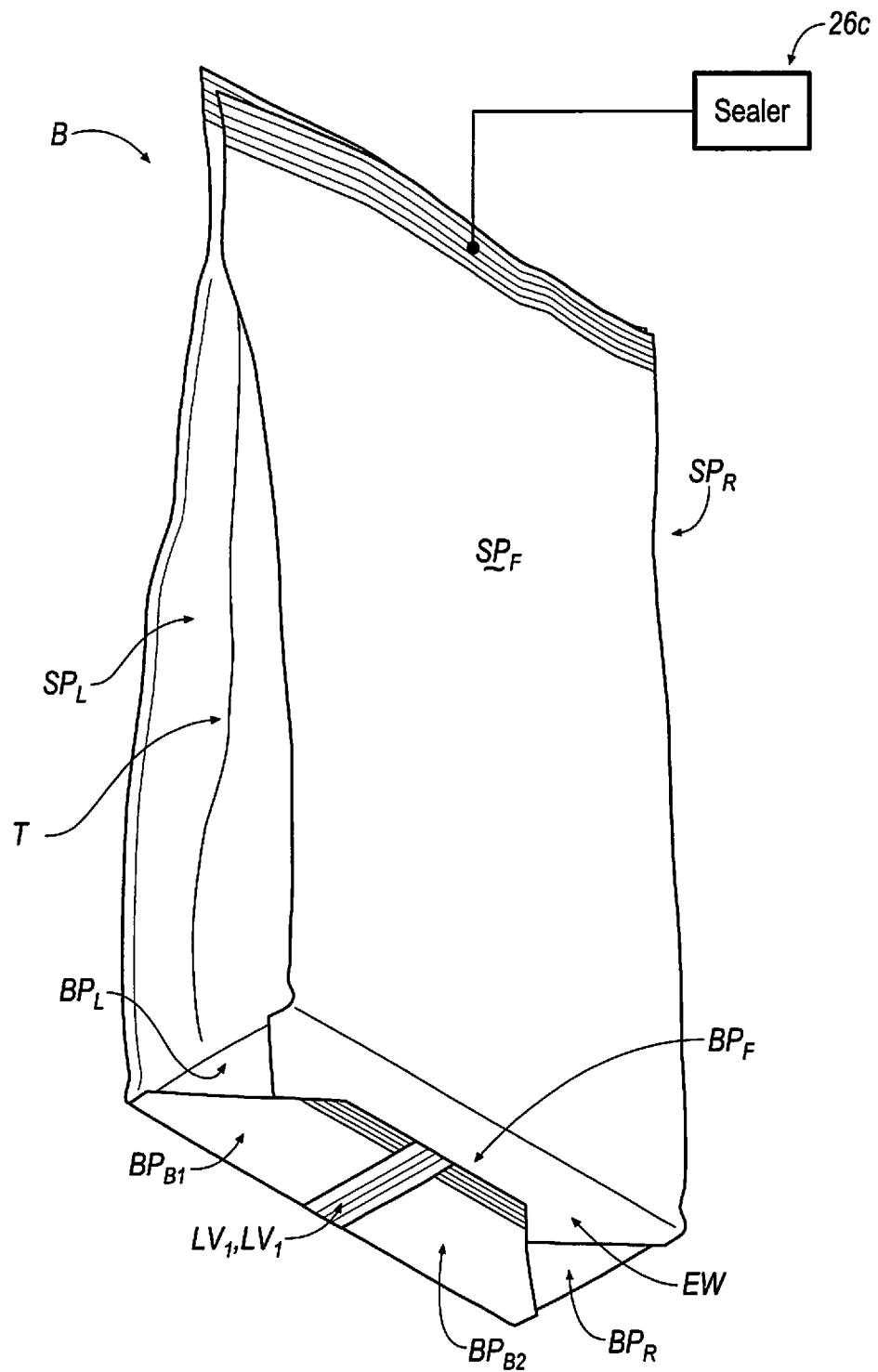
FIG. 13B is a perspective view of the portion of the finishing station of the VFFS system of FIG. 13A and the portion of the segment of the elongated sheet of material of FIG. 13A.
Figure 13C:
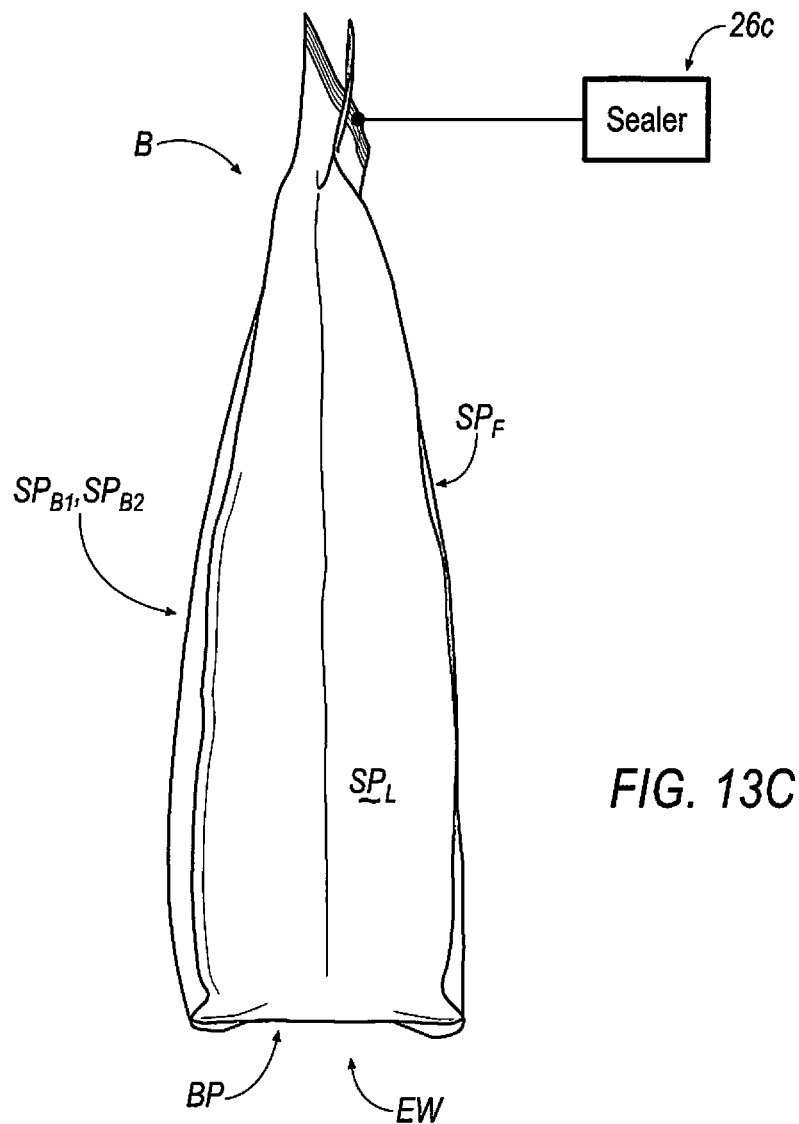
FIG. 13C is a perspective view of the portion of the finishing station of the VFFS system of FIG. 13A and the portion of the segment of the elongated sheet of material of FIG. 13A.
Figure 13D:
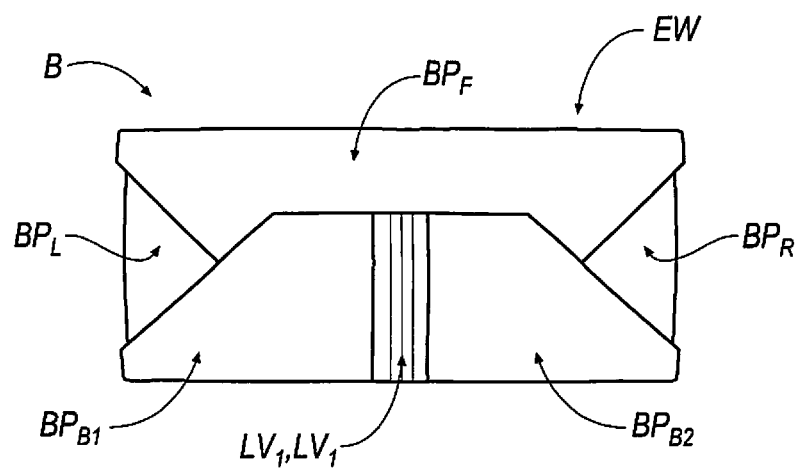
FIG. 13D is a bottom view of the portion of the segment of the elongated sheet of material of FIG. 13A.

Referring to FIGS. 9A, 13A, and 13D, the pair of spaced-apart drive belts 22 may then advance the sealed, folded, gusseted and cut substantially cylindrical or tube-shaped elongated sheet of material S (including the foodstuff F deposited therein) through the finishing station 26 such that the enclosed end wall EW of the sealed, folded, gusseted and cut substantially cylindrical or tube-shaped elongated sheet of material S (including the foodstuff F deposited therein) is moved past the sealing mechanism 26c. Movement of the sealed, folded, gusseted and cut substantially cylindrical or tube-shaped elongated sheet of material S (including the foodstuff F deposited therein) may cease once the top edge $E_T$ of the sealed, folded, gusseted and cut substantially cylindrical or tube-shaped elongated sheet of material S (including the foodstuff F deposited therein) is arranged proximate the sealing mechanism 26c. Then, the sealing mechanism 26c may be actuated again for simultaneously sealing the top edge $E_T$ of the sealed, folded, gusseted and cut substantially cylindrical or tube-shaped elongated sheet of material S (including the foodstuff F deposited therein) while also simultaneously forming an enclosed end wall EW of the next segment of the plurality of segments $S_P$ reeled from the elongated sheet of material S. When the top edge $E_T$ of the sealed, folded, gusseted and cut substantially cylindrical or tube-shaped elongated sheet of material S (including the foodstuff F deposited therein) is sealed as described above, the sealing mechanism 26c may also include a cutter that severs the sealed, folded, gusseted and cut substantially cylindrical or tube-shaped elongated sheet of material S (including the foodstuff F deposited therein), along the top edge $E_T$ to thereby provide the flat bottom stand-up bag B with the foodstuff F provided therein.

Figure 9D:
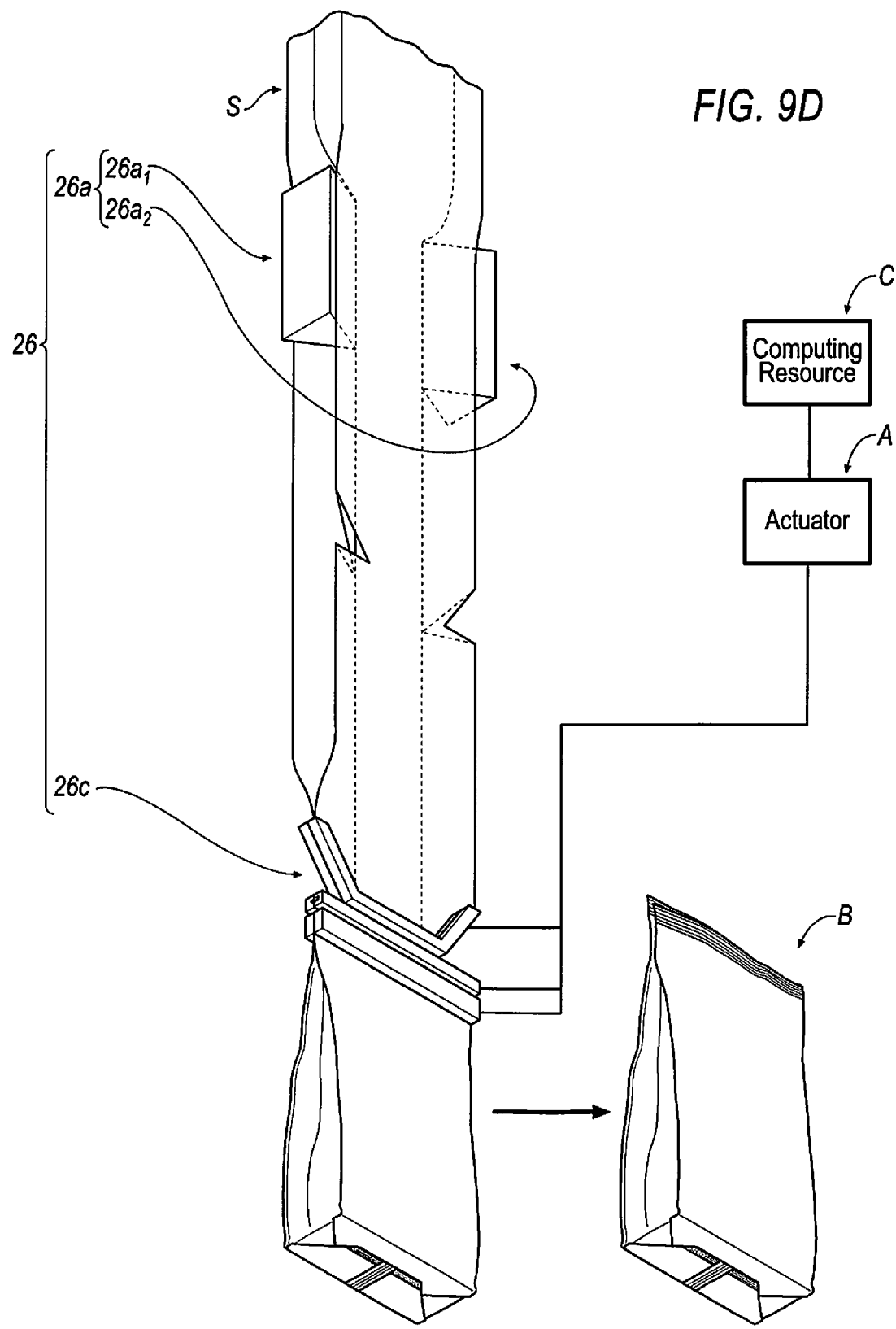
FIG. 9D is a perspective view of an exemplary finishing station of the VFFS system of FIG. 9A.

Referring to FIG. 9D, another exemplary implementation of the VFFS system 10' including a gusseting mechanism 26a defined by a first stationary gusseting rail $26a_1$ and a second stationary gusseting rail $26a_2$ defining a pair of stationary gusseting rails 26a is described. The VFFS system 10' of FIG. 9D is substantially similar to the VFFS system 10' of FIG. 9B with the exception that the VFFS system 10' of FIG. 9D does not include a cutting mechanism (i.e., the finishing station 26 of the VFFS system 10' of FIG. 9D only includes the gusseting mechanism 26a and the sealing mechanism 26c). Because the VFFS system 10' of FIG. 9D does not include a cutting mechanism, the sheet of material S that is interfaced with the VFFS system 10' may be pre-cut in a manner to include at least one first cut $DC_1$ and at least one second cut $DC_2$. As shown in FIG. 9C, the pre-cuts $DC_1$, $DC_2$ formed in the sheet of material S may include a substantially triangular shape.

Figure 9E:
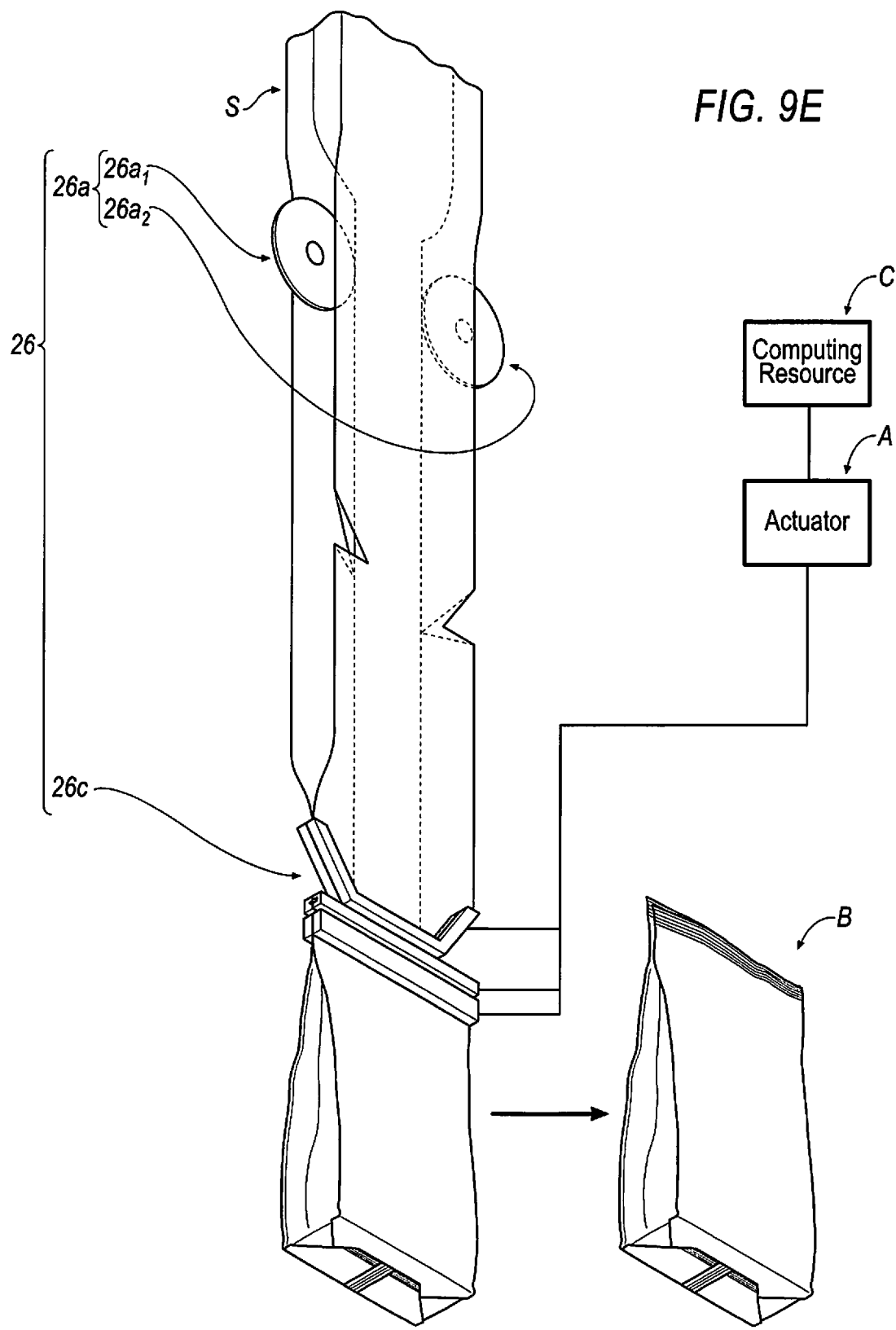
FIG. 9E is a perspective view of an exemplary finishing station of the VFFS system of FIG. 9A.

Referring to FIG. 9E, another exemplary implementation of the VFFS system 10' including a gusseting mechanism 26a defined by a first gusseting disk $26a_1$ and a second gusseting disk $26a_2$ defining a pair of gusseting disk 26a is described. The VFFS system 10' of FIG. 9D is substantially similar to the VFFS system 10' of FIG. 9B with the exception that the VFFS system 10' of FIG. 9D does not include a cutting mechanism (i.e., the finishing station 26 of the VFFS system 10' of FIG. 9D only includes the gusseting mechanism 26a and the sealing mechanism 26c). Because the VFFS system 10' of FIG. 9D does not include a cutting mechanism, the sheet of material S that is interfaced with the VFFS system 10' may be pre-cut in a manner to include at least one first cut $DC_1$ and at least one second cut $DC_2$.

Figure 14A:
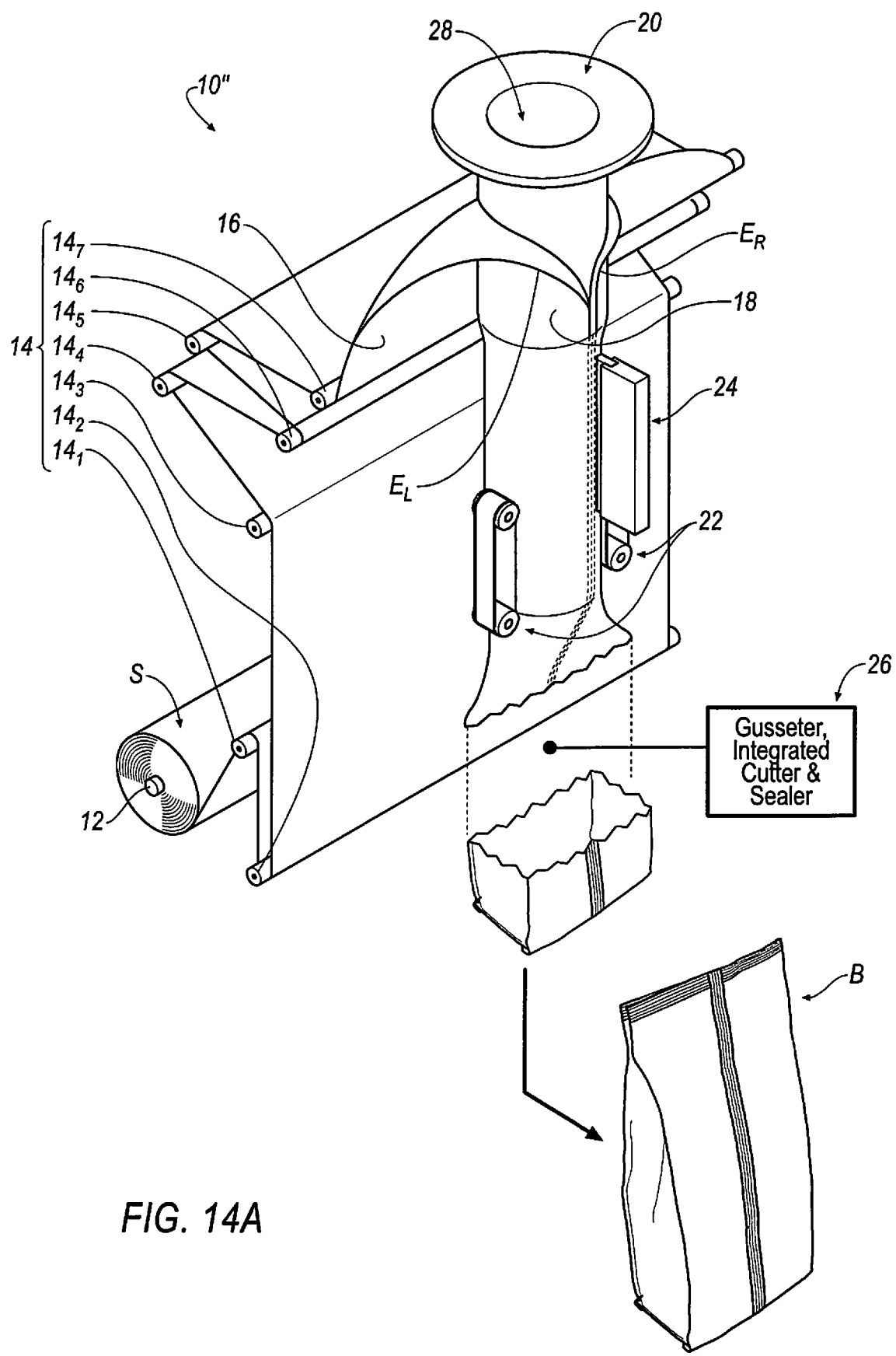
FIG. 14A is a perspective view of an exemplary VFFS system.
Figure 22:
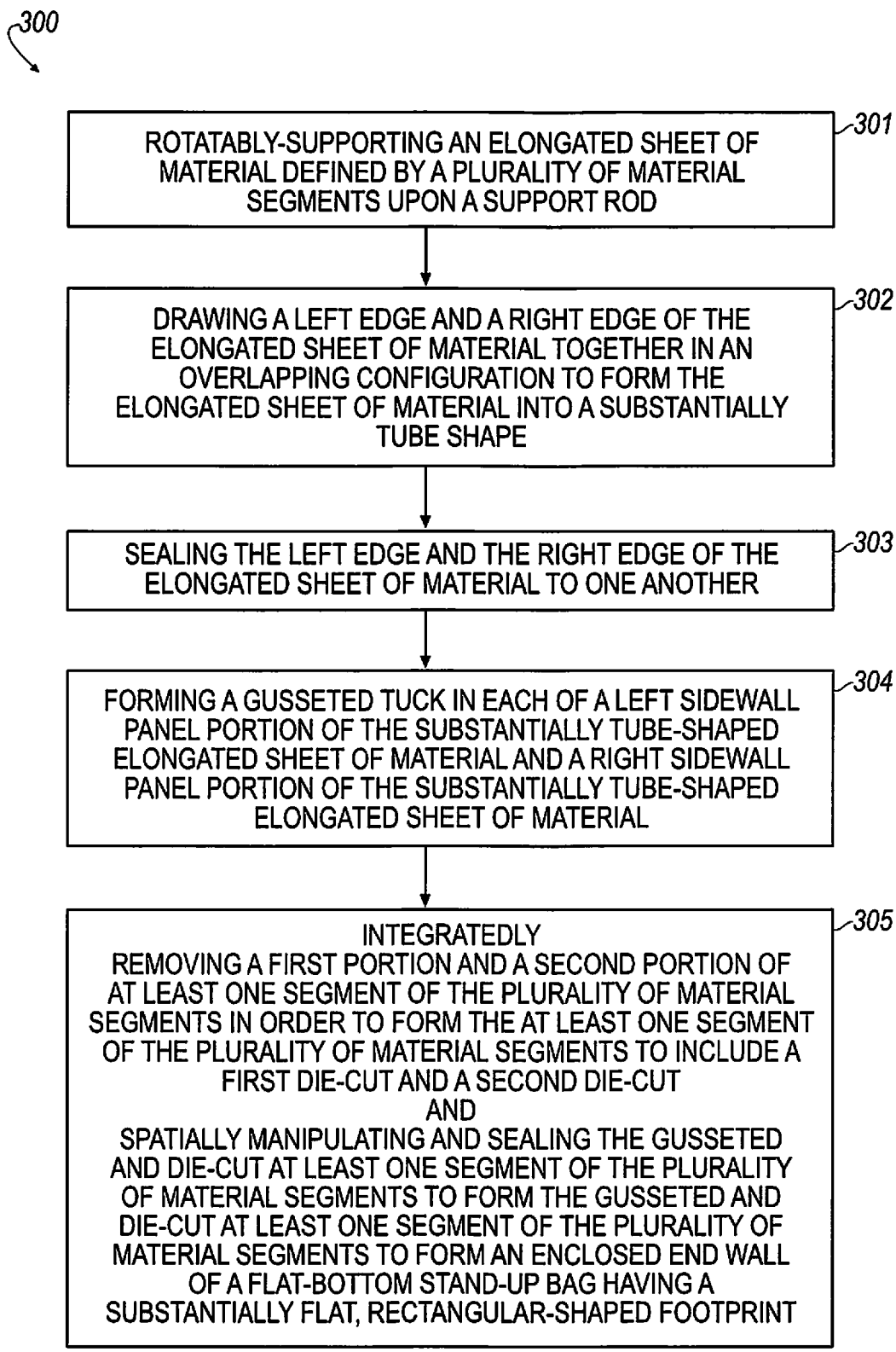
FIG. 22 is a flow diagram of yet another exemplary method for forming a flat-bottom stand-up bag from the elongated sheet of material including the plurality of segments of FIG. 2.

Referring to FIG. 14A, an exemplary method (see also, e.g., 300 at FIG. 22) for utilizing a VFFS system 10" is described. In some implementations, the steps 301-305 of the method 300 are sequentially carried out in successive order.

An elongated sheet of material S is rotatably supported on the support rod 12 at 301 and is arranged about the plurality of tensioners 14 in order to keep the elongated sheet of material S taught as the elongated sheet of material S is guided through the VFFS system 10". The plurality of tensioners 14 may be defined by at least, for example, a leading tensioner $14_1$ and a trailing tensioner $14_7$. In some instances, the plurality of tensioners 14 may also include a plurality of intermediate tensioners $14_2$-$14_6$ arranged between the leading tensioner $14_1$ and the trailing tensioner $14_7$. The elongated sheet of material S is passed from the trailing tensioner $14_7$ for subsequent guiding over the sheet guide 16 and toward the vertically arranged forming tube 18 and the product delivery cylinder 20.

The sheet guide 16 directs the elongated sheet of material S into the vertically arranged forming tube 18 that is arranged around the product delivery cylinder 20. Once the elongated sheet of material S is directed into the vertically-arranged forming tube 18, the vertically-arranged forming tube 18 draws the left edge $E_L$ and the right edge $E_R$ of the elongated sheet of material S together in an overlapping configuration while also reconfiguring the spatial geometry of the elongated sheet of material S from a substantially planar shape (as seen, e.g., about the plurality of tensioners 14) to a substantially cylindrical or tube shape about the vertically-arranged forming tube 18 at 302. The pair of spaced-apart drive belts 22 is arranged in direct contact with the substantially cylindrical or tube-shaped elongated sheet of material S for advancing the substantially cylindrical or tube-shaped elongated sheet of material S along the vertically arranged forming tube 18 and away from a material depositing opening 28 of the product delivery cylinder 20.

As the substantially cylindrical or tube-shaped elongated sheet of material S is pulled downwardly by the pair of spaced-apart drive belts 22, the overlapping configuration of the left edge $E_L$ and the right edge $E_R$ of the elongated sheet of material S results in at least a portion of the first half of the vertically-sealable lip portion $LV_1$ being arranged in an overlapped orientation with respect to at least a portion of the second half of the vertically-sealable lip portion $LV_2$. Once the first half of the vertically sealable lip portion $LV_1$ is overlapped with the second half of the vertically sealable lip portion $LV_2$ the first half of the vertically sealable lip portion $LV_1$ is joined to the second half of the vertically sealable lip portion $LV_2$ by the vertical sealer 24 at 303.

Figure 14B:
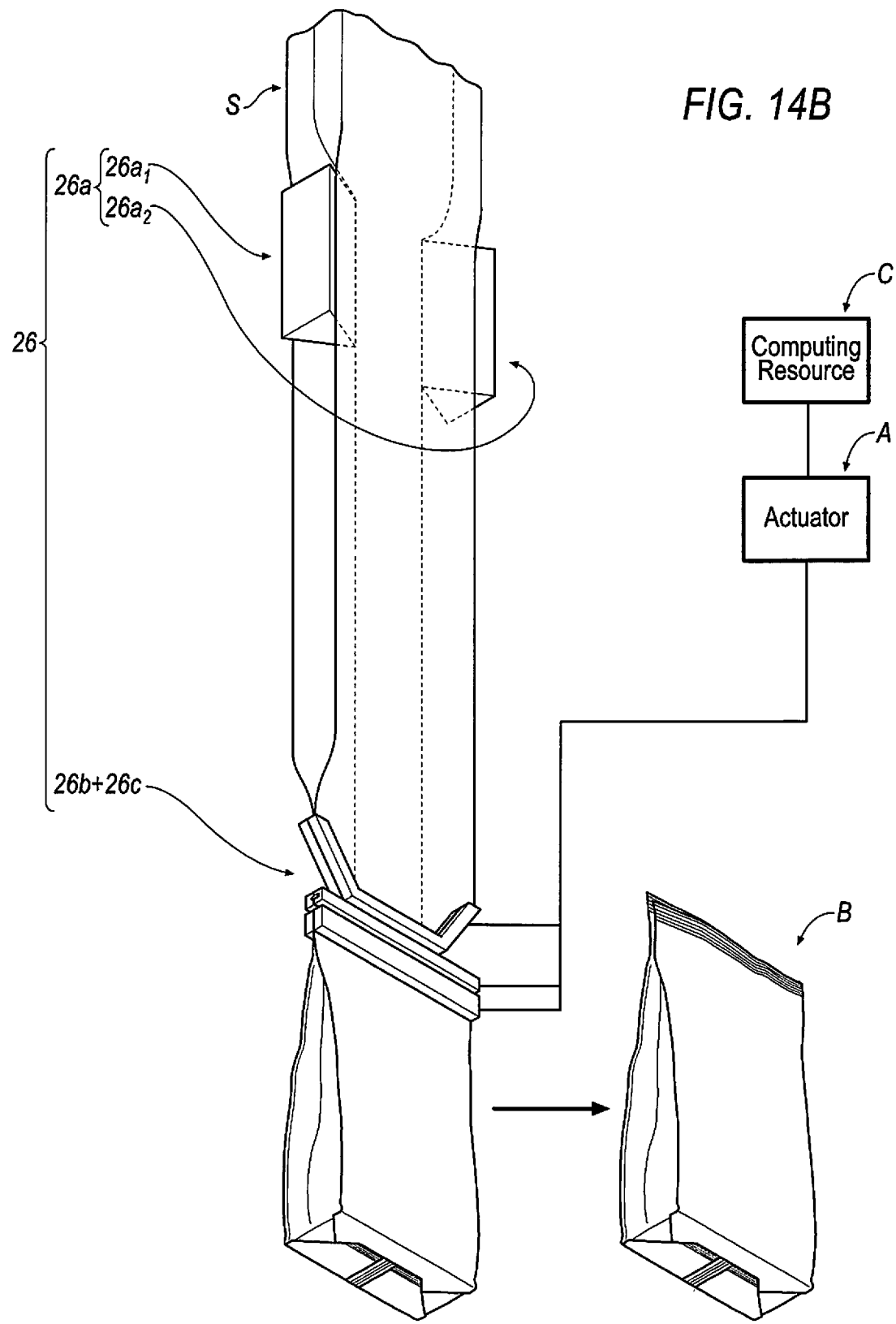
FIG. 14B is a perspective view of an exemplary finishing station of the VFFS system of FIG. 14A.
Figure 14C:
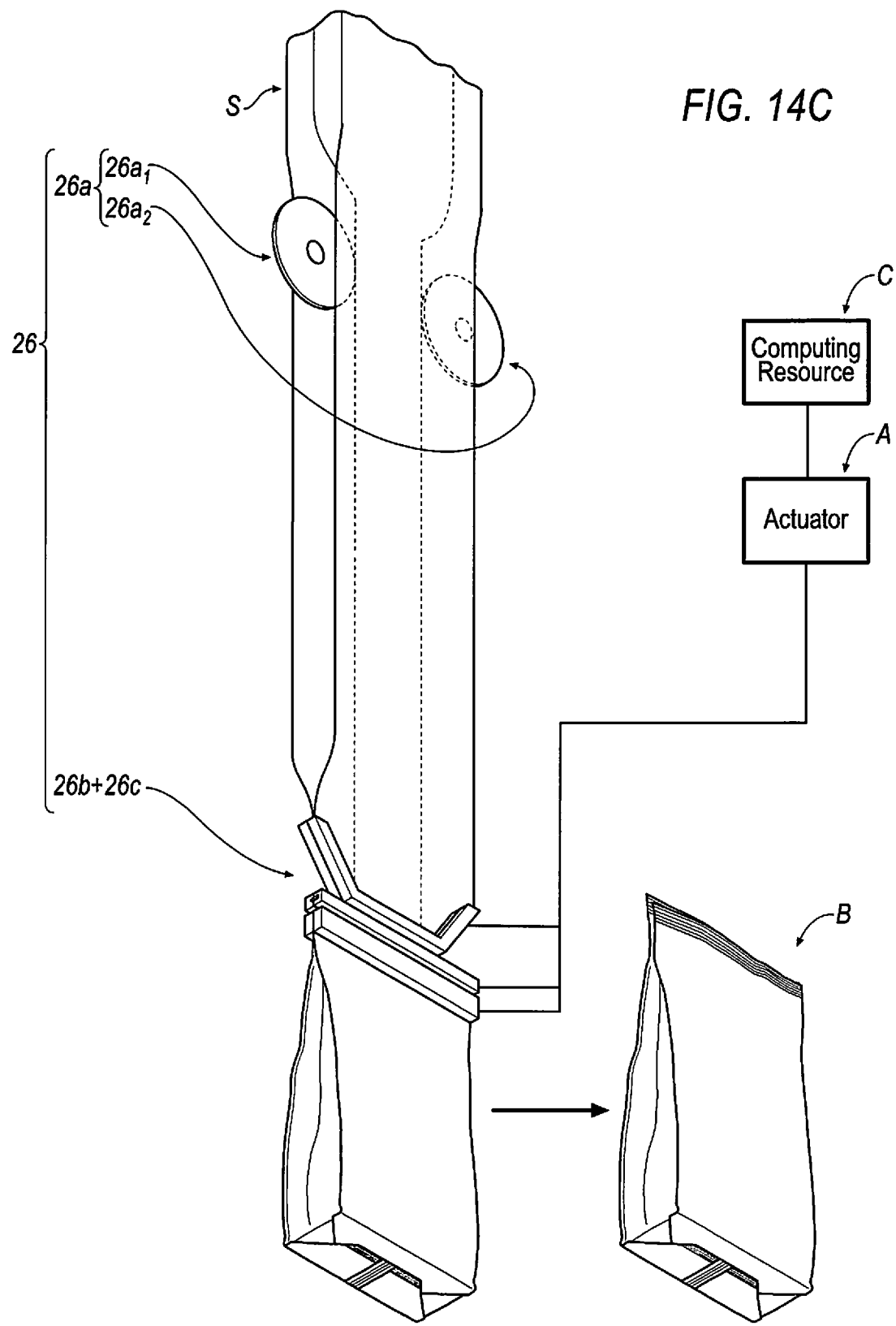
FIG. 14C is a perspective view of an exemplary finishing station of the VFFS system of FIG. 14A.

After the first half of the vertically-sealable lip portion $LV_1$ is joined to the second half of the vertically-sealable lip portion $LV_2$ by the vertical sealer 24, the substantially cylindrical or tube-shaped elongated sheet of material S is advanced away from the vertical sealer 24 by the pair of spaced-apart drive belts 22 and toward the finishing station 26. Referring to FIGS. 14B and 14C, the finishing station 26 may include one or more mechanisms 26a, 26b, and 26c for further spatially and physically manipulating the substantially cylindrical or tube-shaped elongated sheet of material S that will ultimately provide the substantially flat, rectangular-shaped footprint of the flat-bottom stand-up bag B. Some or all of the one or more mechanisms may be connected to one or more actuators A. The one or more actuators A may cause the one or more mechanisms 26a, 26b, 26c to be spatially manipulated relative to the sheet of material S in order to form the flat-bottom stand-up bag B. The one or more actuators A may be connected to a computing resource C. The computing resource C may send one or more periodic actuating signals to the one or more actuators A for causing movement of or actuating the one or more actuators A.

Referring to FIGS. 14B and 15A-15C, in some implementations, the finishing station 26 includes a gusseting mechanism 26a defined by a first stationary gusseting rail $26a_1$ and a second stationary gusseting rail $26a_2$ defining a pair of stationary gusseting rails 26a. The first stationary gusseting rail $26a_1$ is spaced apart from the second stationary gusseting rail $26a_2$ by a distance D, thereby forming a gap G therebetween.

With reference to FIGS. 14B, 15A, and 15B, the pair of spaced-apart drive belts 22 advances the substantially cylindrical or tube-shaped elongated sheet of material S through the finishing station 26 such that the substantially cylindrical or tube-shaped elongated sheet of material S is drawn through the gap G between the first stationary gusseting rail $26a_1$ and the second stationary gusseting rail $26a_2$. With reference to FIGS. 15B-15C, because a spacing between the left sidewall panel portion $SP_L$ and the right sidewall panel portion $SP_R$ of the substantially cylindrical or tube-shaped elongated sheet of material S is defined by a geometry that is greater than the distance D between the first stationary gusseting rail $26a_1$ and a second stationary gusseting rail $26a_2$, the pair of stationary gusseting rails $26a_1$, $26a_2$ shapes each of the left sidewall panel portion $SP_L$ of the substantially cylindrical or tube-shaped elongated sheet of material S and the right sidewall panel portion $SP_R$ of the substantially cylindrical or tube-shaped elongated sheet of material S to include a gusseted tuck T at 304 as the pair of spaced-apart drive belts 22 advances the substantially cylindrical or tube-shaped elongated sheet of material S through the finishing station 26.

Referring to FIG. 14C, in some instances, the gusseting mechanism 26a may alternatively include a first gusseting disk $26a_1$ and a second gusseting disk $26a_2$ that are spaced apart by a distance D, thereby forming a gap G therebetween. In some examples, the gusseting disks $26a_1$, $26a_2$ may be spatially fixed in place. In other examples, each gusseting disk $26a_1$, $26a_2$ may be permitted to rotate about an axis A-A extending through an axial center of each gusseting disk $26a_1$, $26a_2$. The gusseting disks $26a_1$, $26a_2$ may function in a substantially similar manner as described above with respect to the first stationary gusseting rail $26a_1$ and a second stationary gusseting rail $26a_2$ (FIGS. 15A-15C). If the gusseting disks $26a_1$, $26a_2$ are permitted to rotate about the axis A-A, the gusseting disks $26a_1$, $26a_2$ may passively rotate about the axis A-A as the spaced-apart drive belts 22 advance the substantially cylindrical or tube-shaped elongated sheet of material S through the finishing station 26.

Figure 16A:
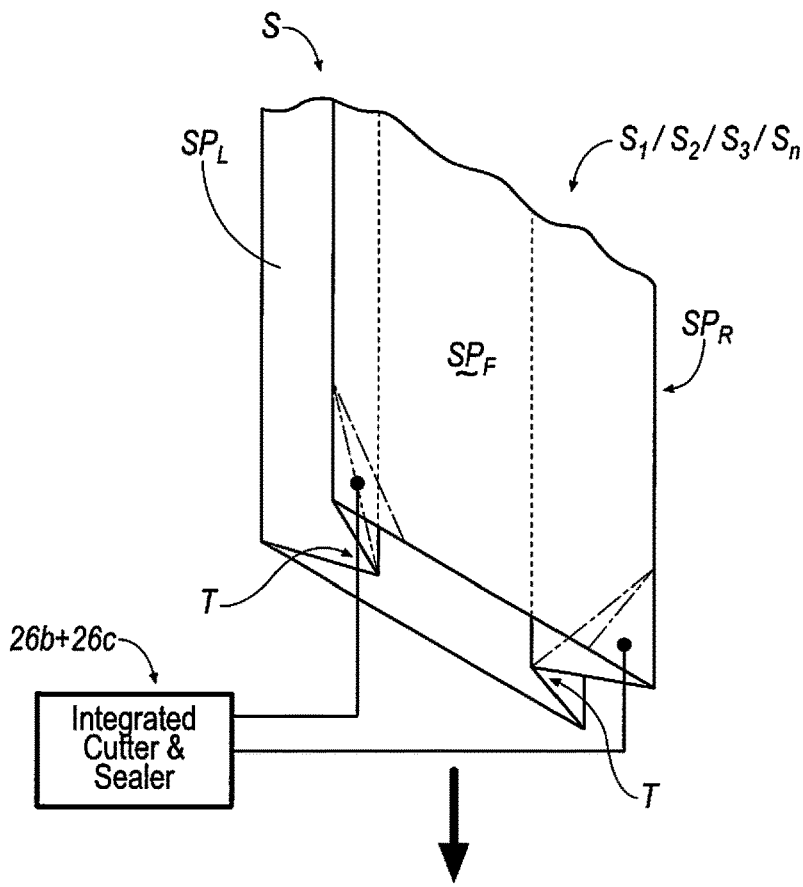
FIG. 16A is a perspective view of a portion of a finishing station of the VFFS system of FIG. 14A and the portion of the segment of the elongated sheet of material of FIG. 15C.
Figure 16B:
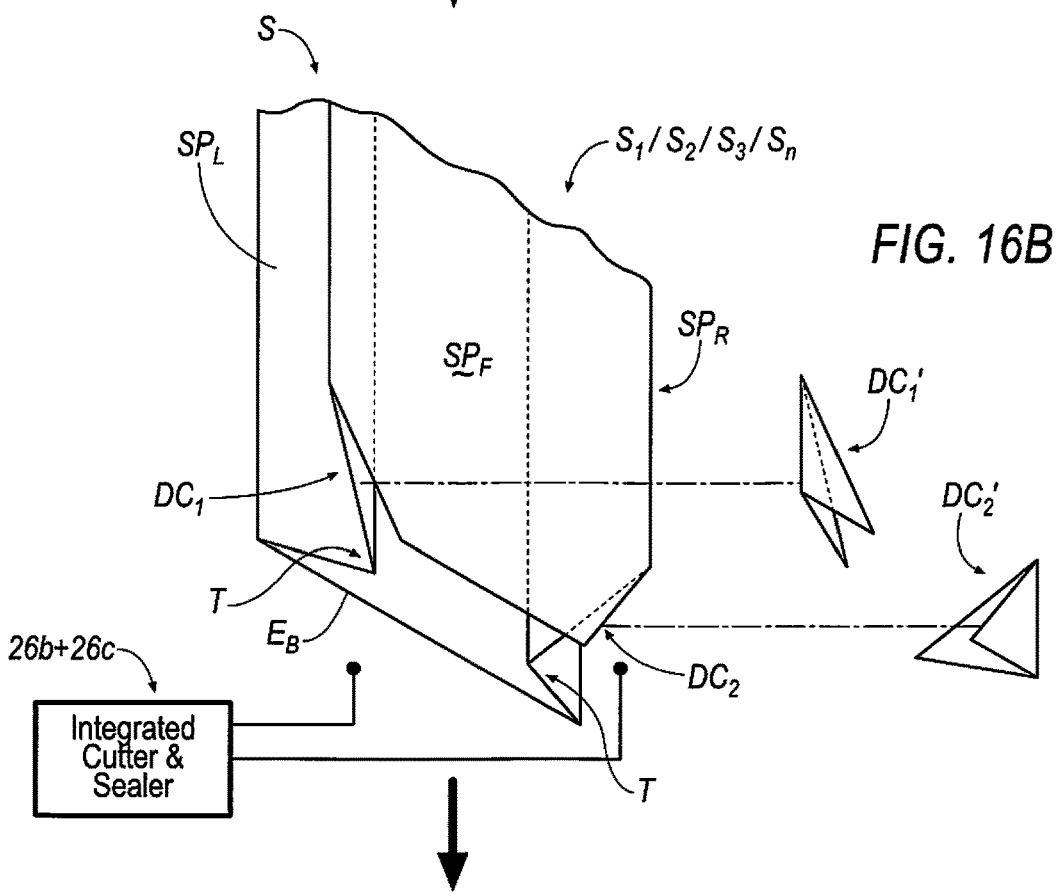
FIG. 16B is a perspective view of the portion of a finishing station of the VFFS system of FIG. 16A and the portion of the segment of the elongated sheet of material of FIG. 16A.
Figure 17:
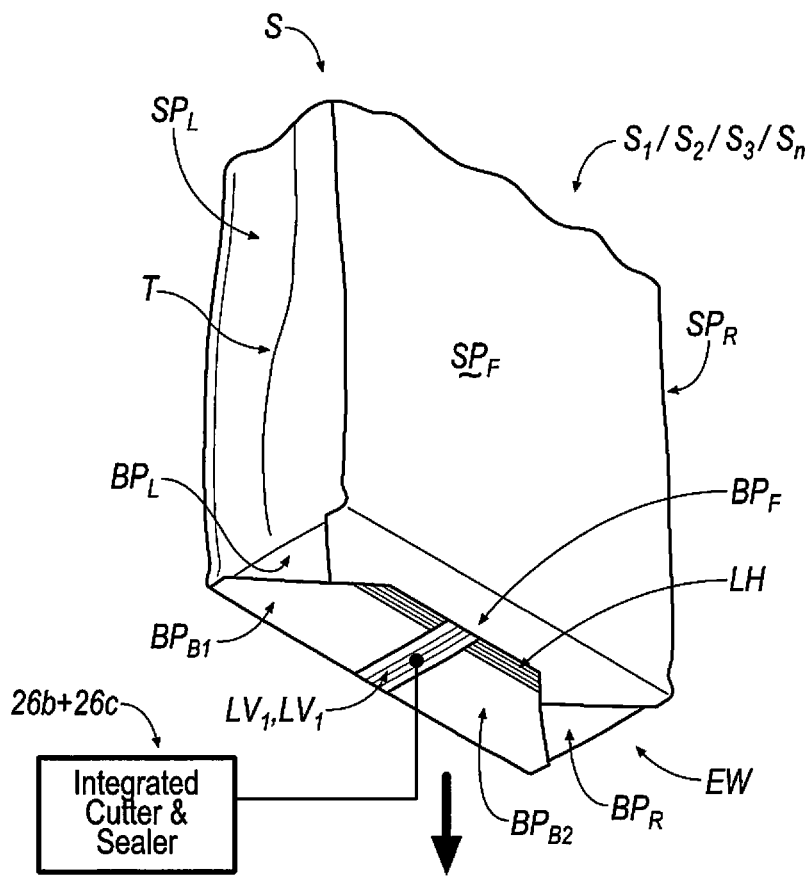
FIG. 17 is a perspective view of a portion of a finishing station of the VFFS system of FIG. 14A and the portion of the segment of the elongated sheet of material of FIG. 16.

Referring to FIGS. 16A and 16B, in some implementations, the finishing station 26 further includes an integrated cutting and sealing mechanism 26b+26c. After the substantially cylindrical or tube-shaped elongated sheet of material S has been shaped to form the gusset tucks T as described above, the pair of spaced-apart drive belts 22 advances the gusseted, substantially cylindrical or tube-shaped elongated sheet of material S through the finishing station 26 such that the gusseted, substantially cylindrical or tube-shaped elongated sheet of material S is interfaced with the integrated cutting and sealing mechanism 26b+26c. The integrated cutting and sealing mechanism 26b+26c simultaneously removes a first portion $DC_1'$ and a second portion $DC_2'$ of the gusseted, substantially cylindrical or tube-shaped elongated sheet of material S in order to form the gusseted, substantially cylindrical or tube-shaped elongated sheet of material S to include a first cut $DC_1$ and a second cut $DC_2$ (as seen in FIGS. 16A-16B) while also sealing the gusseted, substantially cylindrical or tube-shaped elongated sheet of material S (as seen in FIG. 17) at 305.

The cutting component of the cutting and sealing mechanism 26b+26C may include, but is not limited to: one or more knives, one or more scissors, one or more punchers, one or more die-cutters, one or more shears, one or more lasers, or the like. As seen in FIGS. 14B and 14C, the cutting and sealing mechanism 26b+26c may include a "K-shaped" sealing mechanism. Functionally, the sealing portion of the integrated cutting and sealing mechanism 26b+26c may spatially manipulate and seal the gusseted, substantially cylindrical or tube-shaped elongated sheet of material S at 305 in a manner by: (1) folding the bottom edge $E_B$ (see, e.g., FIG. 16B) of the gusseted, substantially cylindrical or tube-shaped elongated sheet of material S such that the front horizontally-sealable lip portion $LH_F$ overlaps with both of the first half of the back horizontally-sealable lip portion $LH_{B1}$ and the second half of the back horizontally-sealable lip portion $LH_{B2}$; and then (2) sealing the front horizontally-sealable lip portion $LH_F$ to both of the first half of the back horizontally-sealable lip portion $LH_{B1}$ and the second half of the back horizontally-sealable lip portion $LH_{B2}$ to thereby seal the plurality of horizontally-sealable lip portions LH and form the enclosed end wall EW.

Figure 18:
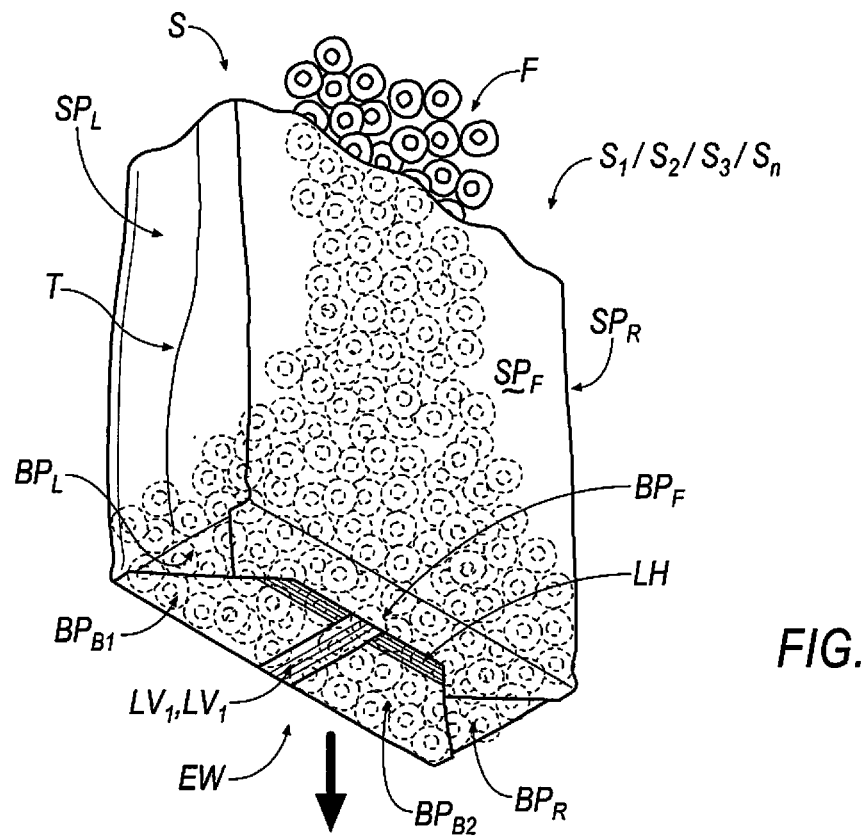
FIG. 18 is a perspective view of a portion of the VFFS system of FIG. 14A and the portion of the segment of the elongated sheet of material of FIG. 17.
Figure 19A:
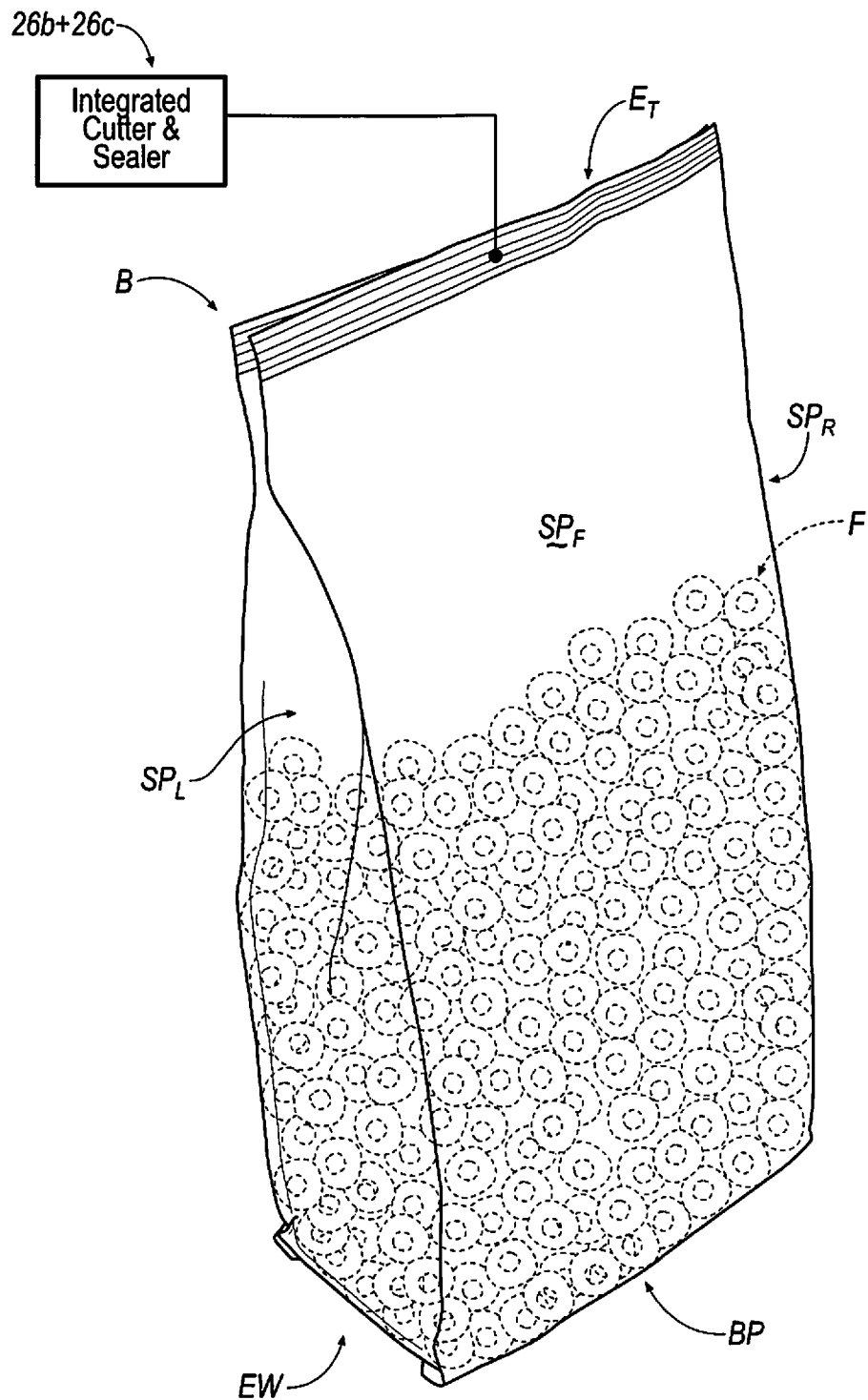
FIG. 19A is a perspective view of a portion of the finishing station of the VFFS system of FIG. 17 and the portion of the segment of the elongated sheet of material of FIG. 18.
Figure 19B:
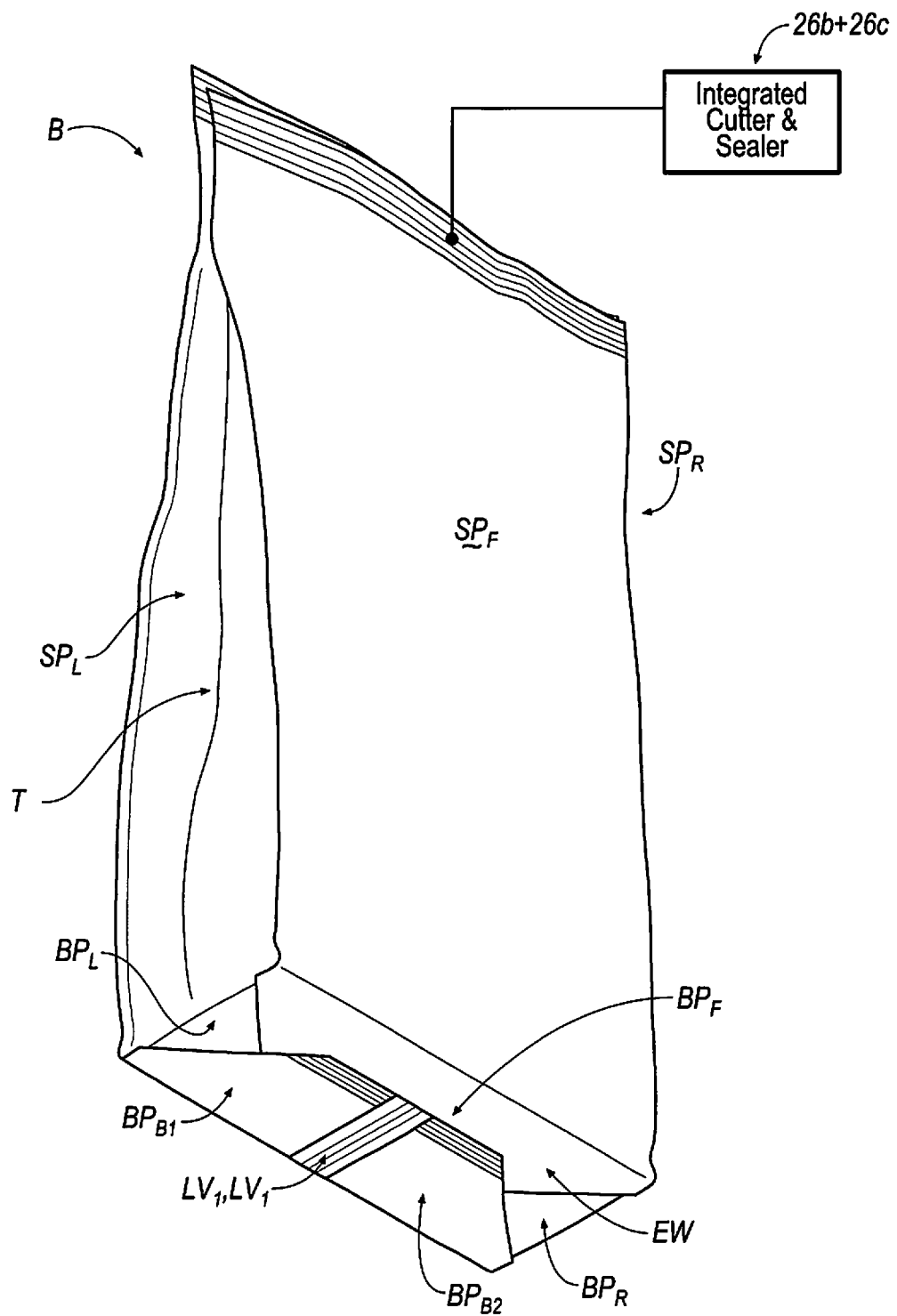
FIG. 19B is another perspective view of the portion of the finishing station of the VFFS system of FIG. 19A and the portion of the segment of the elongated sheet of material of FIG. 19A.
Figure 19C:
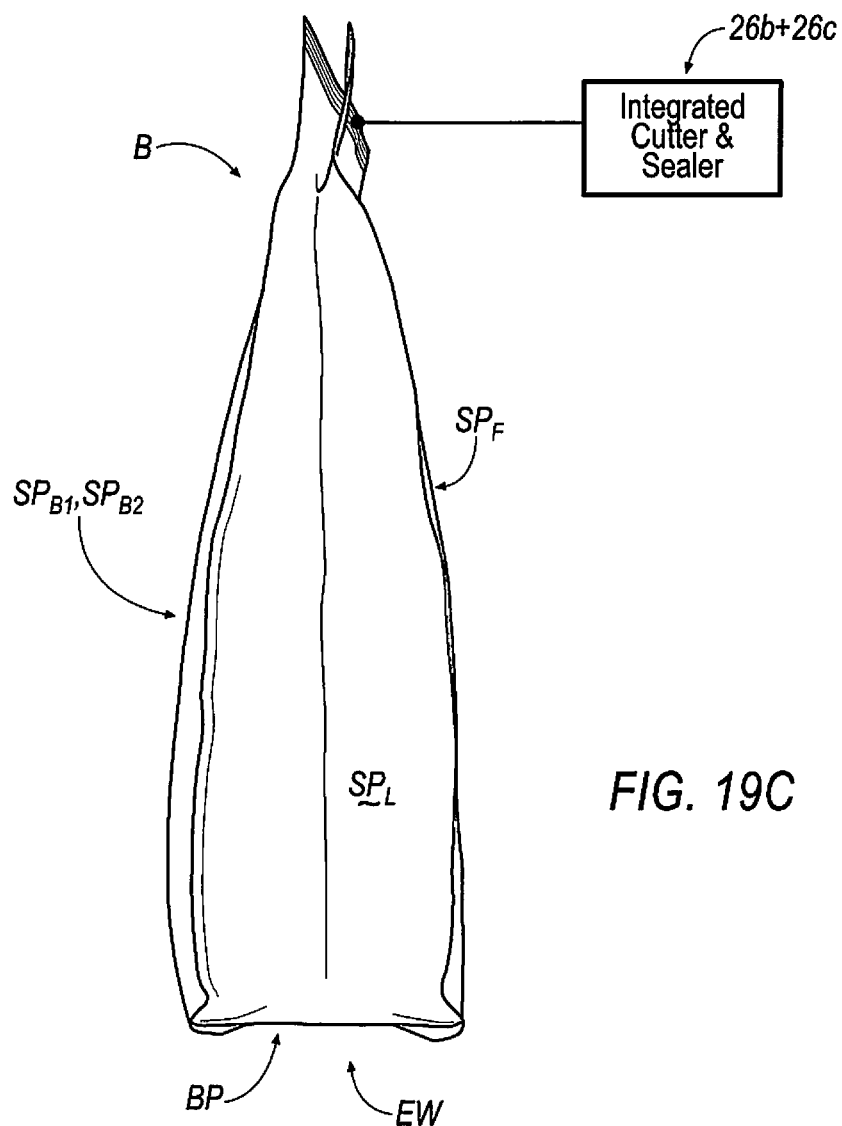
FIG. 19C is another perspective view of the portion of the finishing station of the VFFS system of FIG. 19A and the portion of the segment of the elongated sheet of material of FIG. 19A.
Figure 19D:
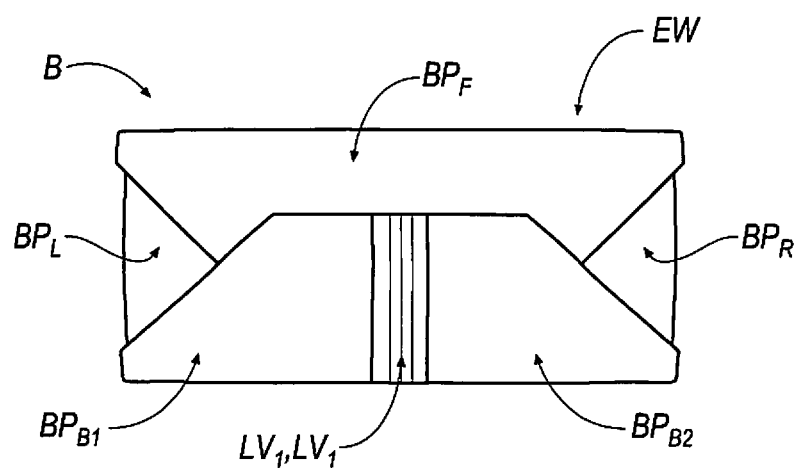
FIG. 19D is a bottom view of the portion of the segment of the elongated sheet of material of FIG. 19A.

Referring to FIG. 18, once the integrated cutting and sealing mechanism 26b+26c of the finishing station 26 simultaneously cuts, folds and seals 305 the gusseted, substantially cylindrical or tube-shaped elongated sheet of material S to form the enclosed end wall EW as described above, the VFFS system 10" is then subsequently actuated for passing foodstuff F (e.g., cereal, chips, popcorn, candy, nuts or the like) through the material depositing opening 28 of the product delivery cylinder 20 and then through the vertically-arranged forming tube 18 for subsequent arrival in a cavity formed by the sealed, folded, cut and gusseted, substantially cylindrical or tube-shaped elongated sheet of material S. The enclosed end wall EW prevents the foodstuff F from escaping out of the cavity of the sealed, folded, cut, gusseted, substantially cylindrical, or tube-shaped elongated sheet of material S while the sealed, folded, cut and gusseted, substantially cylindrical or tube-shaped elongated sheet of material S is still interfaced with the VFFS system 10".

Referring to FIGS. 14A and 19A-19D, the pair of spaced-apart drive belts 22 may then advance the sealed, folded, cut and gusseted, substantially cylindrical or tube-shaped elongated sheet of material S (including the foodstuff F deposited therein), through the finishing station 26 such that the enclosed end wall EW of the sealed, folded, cut and gusseted, substantially cylindrical or tube-shaped elongated sheet of material S (including the foodstuff F deposited therein) is moved past the integrated cutting and sealing mechanism 26b+26c. Movement of the sealed, folded, cut and gusseted, substantially cylindrical or tube-shaped elongated sheet of material S (including the foodstuff F deposited therein), may cease once the top edge $E_T$ of the sealed, folded, cut and gusseted, substantially cylindrical or tube-shaped elongated sheet of material S (including the foodstuff F deposited therein) is arranged proximate the integrated cutting and sealing mechanism 26b+26c. Then, the integrated cutting and sealing mechanism 26b+26c may be actuated again for simultaneously sealing the top edge $E_T$ of the sealed, folded, cut and gusseted, substantially cylindrical or tube-shaped elongated sheet of material S (including the foodstuff F deposited therein) while also simultaneously forming an enclosed end wall EW of the next segment of the plurality of segments $S_P$ reeled from the elongated sheet of material S. When the top edge $E_T$ of the sealed, folded, cut and gusseted, substantially cylindrical or tube-shaped elongated sheet of material S (including the foodstuff F deposited therein) is sealed as described above, a cutter of the integrated cutting and sealing mechanism 26b+26c severs the sealed, folded, cut and gusseted, substantially cylindrical or tube-shaped elongated sheet of material S (including the foodstuff F deposited therein) along the top edge $E_T$ to thereby provide the flat bottom stand-up bag B with the foodstuff F provided therein.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A bag comprising:
   a front panel portion having a first end including a first cross member extending between and connecting a first leg and a second leg to provide said first end with a substantially "U" shape;
   a rear panel portion having a second end including a second cross member extending between and connecting a third leg and a fourth leg to provide said second end with a substantially "U" shape, said second cross member attached to said first cross member to create a first sealed joint between said front panel portion and said rear panel portion;
   a first side panel extending between and connecting said front panel portion and said rear panel portion at said first leg and said third leg, said first side panel creating a second sealed joint at a junction of said first side panel and said first leg and a third sealed joint at a junction of said first side panel and said third leg; and
   a second side panel extending between and connecting said front panel portion and said rear panel portion at said second leg and said fourth leg, said second side panel creating a fourth sealed joint at a junction of said second side panel and said second leg and a fifth sealed joint at a junction of said second side panel and said fourth leg,
   wherein the first leg is folded and the third leg at least partially overlaps the first leg, and the second leg is folded and the fourth leg at least partially overlaps the second leg, and the first sealed joint overlaps the first end of the front panel to provide the bag with a substantially flat end wall.

2. The bag of claim 1, wherein the first sealed joint is sealed to the first end of the front panel.

3. The bag of claim 1, wherein said first leg and said second leg are deformed at said fold to maintain the folded nature of said first leg and said second leg.

4. The bag of claim 1, wherein said first leg and said second leg extend from said first cross member at an obtuse angle and in opposite directions from one another, and wherein said third leg and said fourth leg extend from said second cross member at an obtuse angle and in opposite directions from one another.

5. The bag of claim 1, wherein said second sealed joint and said third sealed joint terminate at said first sealed joint, and wherein said fourth sealed joint and said fifth sealed joint terminate at said first sealed joint.

6. The bag of claim 5, wherein said first sealed joint cooperates with said second sealed joint and said fourth sealed joint to provide said first end with a continuous, sealed joint extending along said first leg, said second leg, and said first cross member, and wherein said first sealed joint cooperates with said third sealed joint and said fifth sealed joint to provide said second end with a continuous, sealed joint extending along said third leg, said fourth leg, and said second cross member.

* * * * *